US010252795B2

(12) United States Patent
Kornatowski et al.

(10) Patent No.: US 10,252,795 B2
(45) Date of Patent: Apr. 9, 2019

(54) FOLDABLE AIRCRAFT WITH PROTECTIVE CAGE FOR TRANSPORTATION AND TRANSPORTABILITY

(71) Applicant: Ecole Polytechnique Federale de Lausanne (EPFL), Lausanne (CH)

(72) Inventors: Przemyslaw Mariusz Kornatowski, Ecublens VD (CH); Stefano Mintchev, Lausanne (CH); Dario Floreano, St-Prex (CH)

(73) Assignee: Ecole Polytechnique Federale de Lausanne (EPFL), Lausanne (CH)

(*) Notice: Subject to any disclaimer, the term of this patent is extended or adjusted under 35 U.S.C. 154(b) by 264 days.

(21) Appl. No.: 15/093,872

(22) Filed: Apr. 8, 2016

(65) Prior Publication Data

US 2017/0291697 A1 Oct. 12, 2017

(51) Int. Cl.
B64C 27/20 (2006.01)
B64C 27/08 (2006.01)
B64C 27/00 (2006.01)
B64C 39/02 (2006.01)

(52) U.S. Cl.
CPC ............ *B64C 27/006* (2013.01); *B64C 27/08* (2013.01); *B64C 27/20* (2013.01); *B64C 39/024* (2013.01); *B64C 2201/027* (2013.01); *B64C 2201/108* (2013.01); *B64C 2201/128* (2013.01)

(58) Field of Classification Search
CPC ..... B64C 27/006; B64C 27/20; B64C 11/001; B64C 2201/027; B64C 2201/108
See application file for complete search history.

(56) References Cited

U.S. PATENT DOCUMENTS

| 4,932,839 A | * | 6/1990 | Pitchford | ................. B60V 1/14 416/246 |
| 7,273,195 B1 | | 9/2007 | Golliher | |
| 9,878,258 B2 | * | 1/2018 | Matloff | .................... B64C 27/08 |
| 2016/0280359 A1 | * | 9/2016 | Semke | .................. B64C 27/006 |
| 2017/0050726 A1 | * | 2/2017 | Yamada | ................... B64C 27/20 |
| 2017/0225782 A1 | * | 8/2017 | Kohstall | ............... B64C 39/024 |

FOREIGN PATENT DOCUMENTS

| CN | 204998752 U | 1/2016 |
| EP | 2813428 A1 | 12/2014 |
| WO | 2015149000 A1 | 10/2015 |

OTHER PUBLICATIONS

International Search Report of PCT/IB2017/052034.

* cited by examiner

Primary Examiner — Richard R. Green
(74) Attorney, Agent, or Firm — Seyfarth Shaw LLP; Brian Michaelis

(57) ABSTRACT

An aerial vehicle, configured to transport cargo, and including a propulsion system and a foldable cage is described. The foldable cage is substantially linear while in a folded configuration, and substantially circular while in a deployed configuration. Moreover, the foldable cage includes a rods that form isosceles triangles. The rods are coupled together by flexible joints.

19 Claims, 19 Drawing Sheets

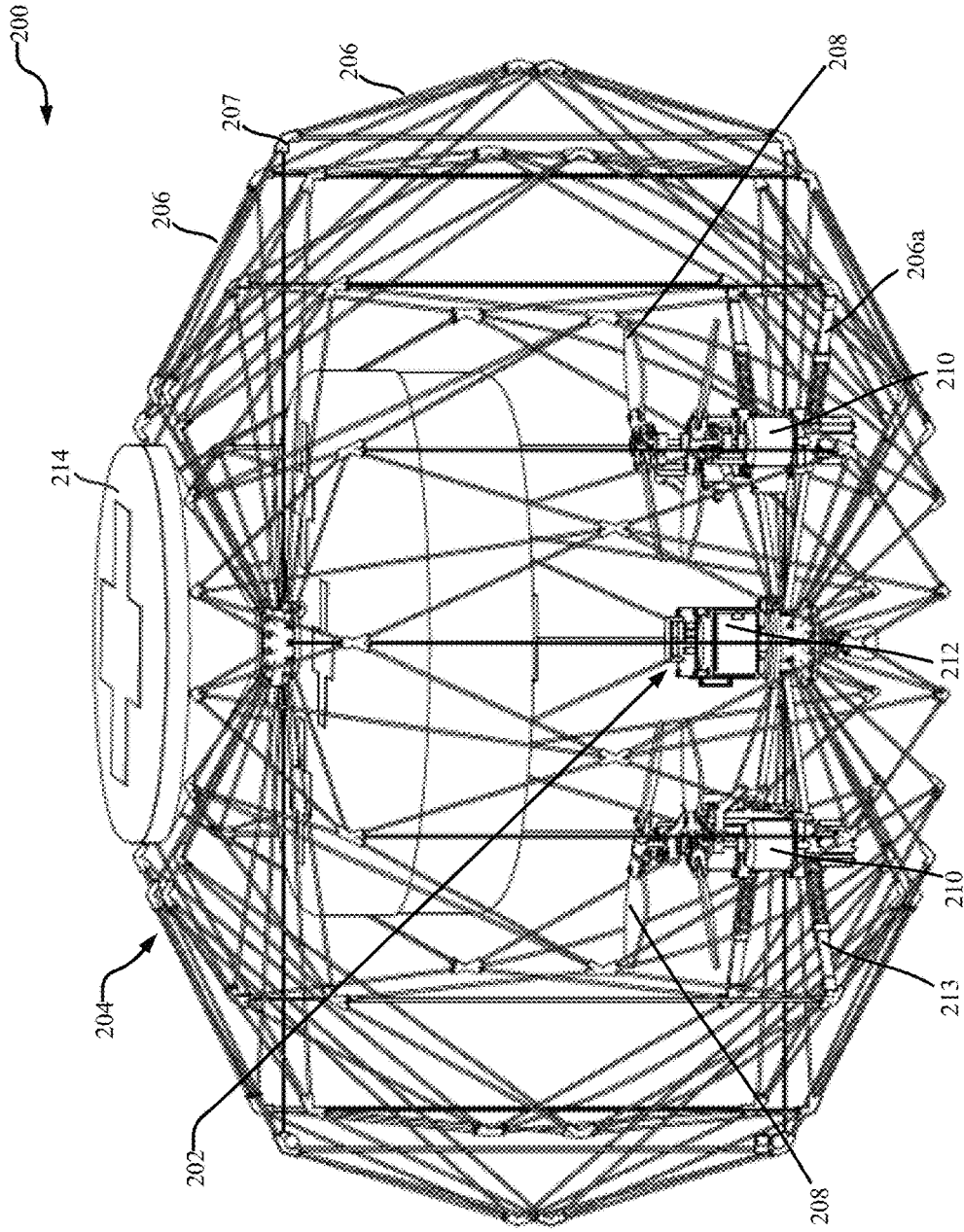

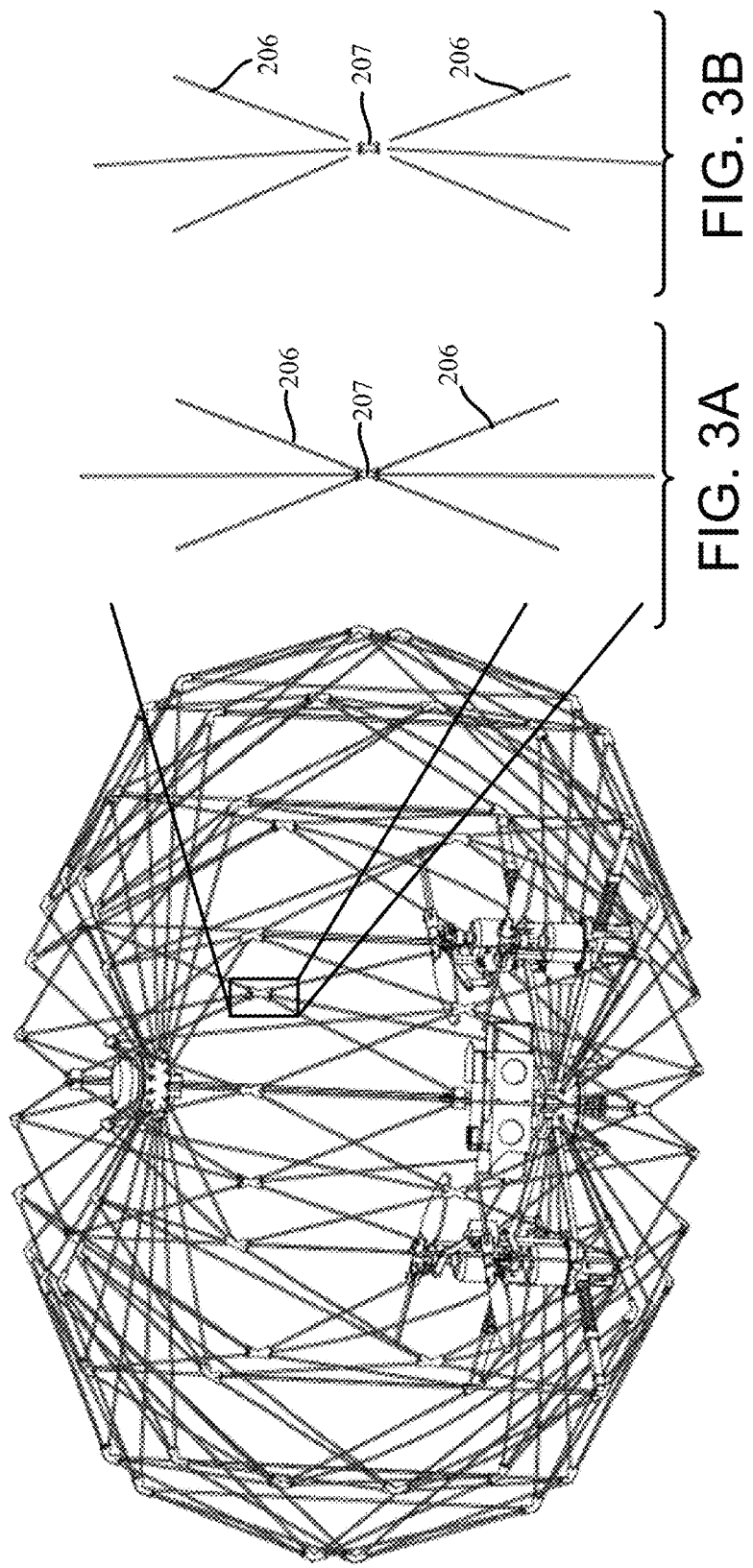

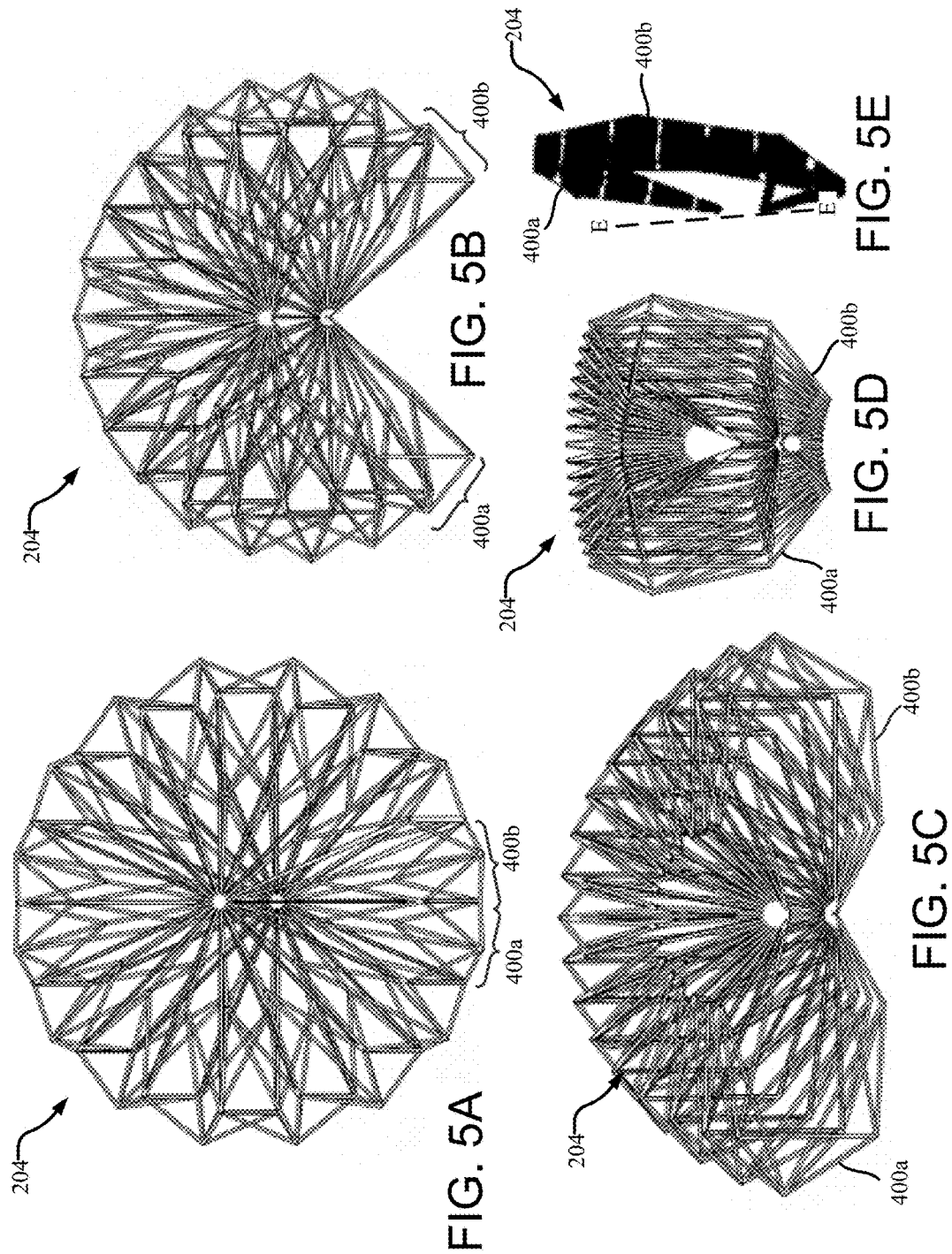

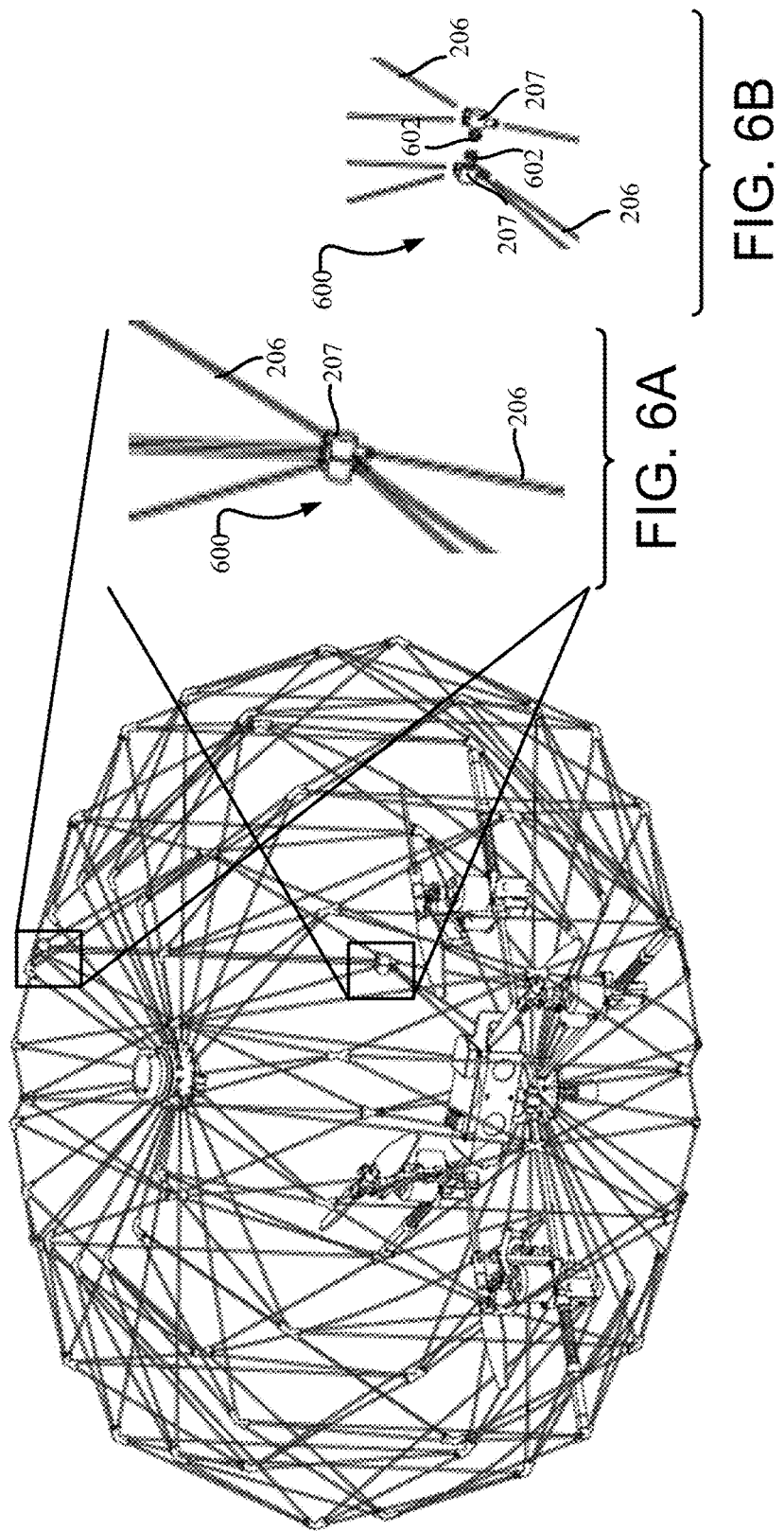

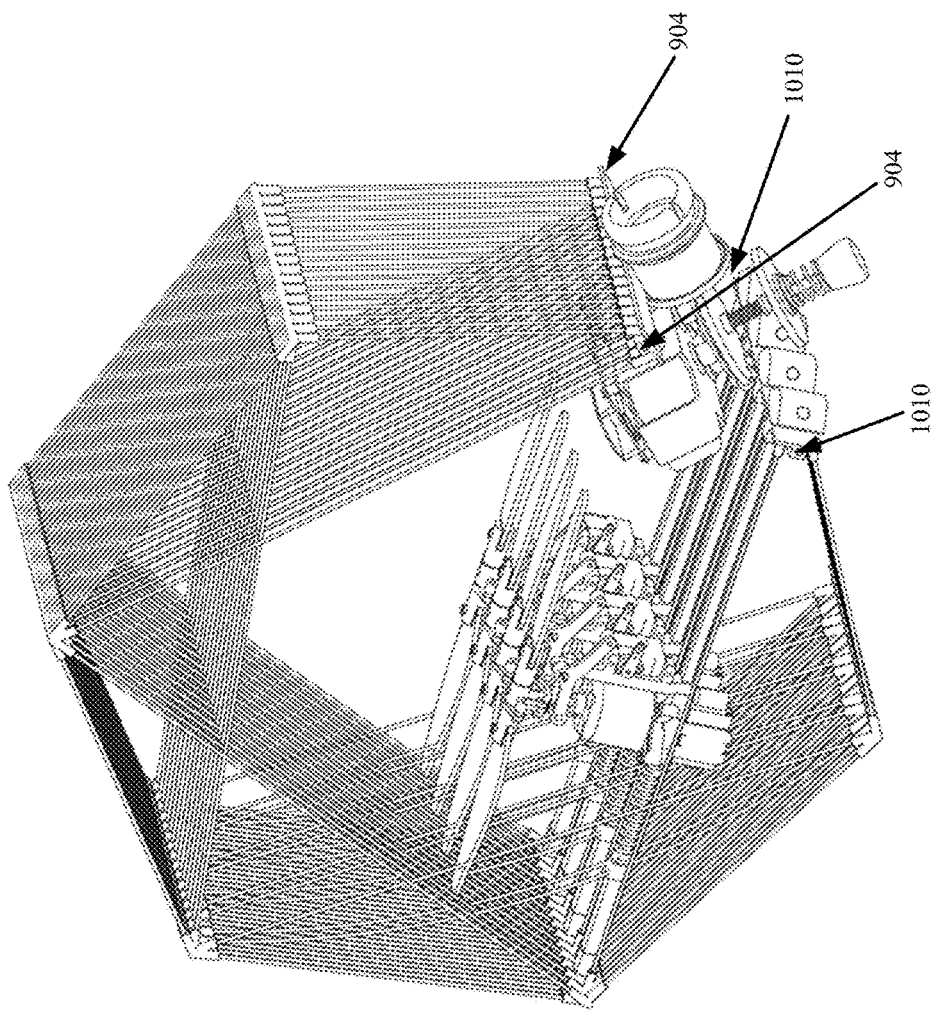

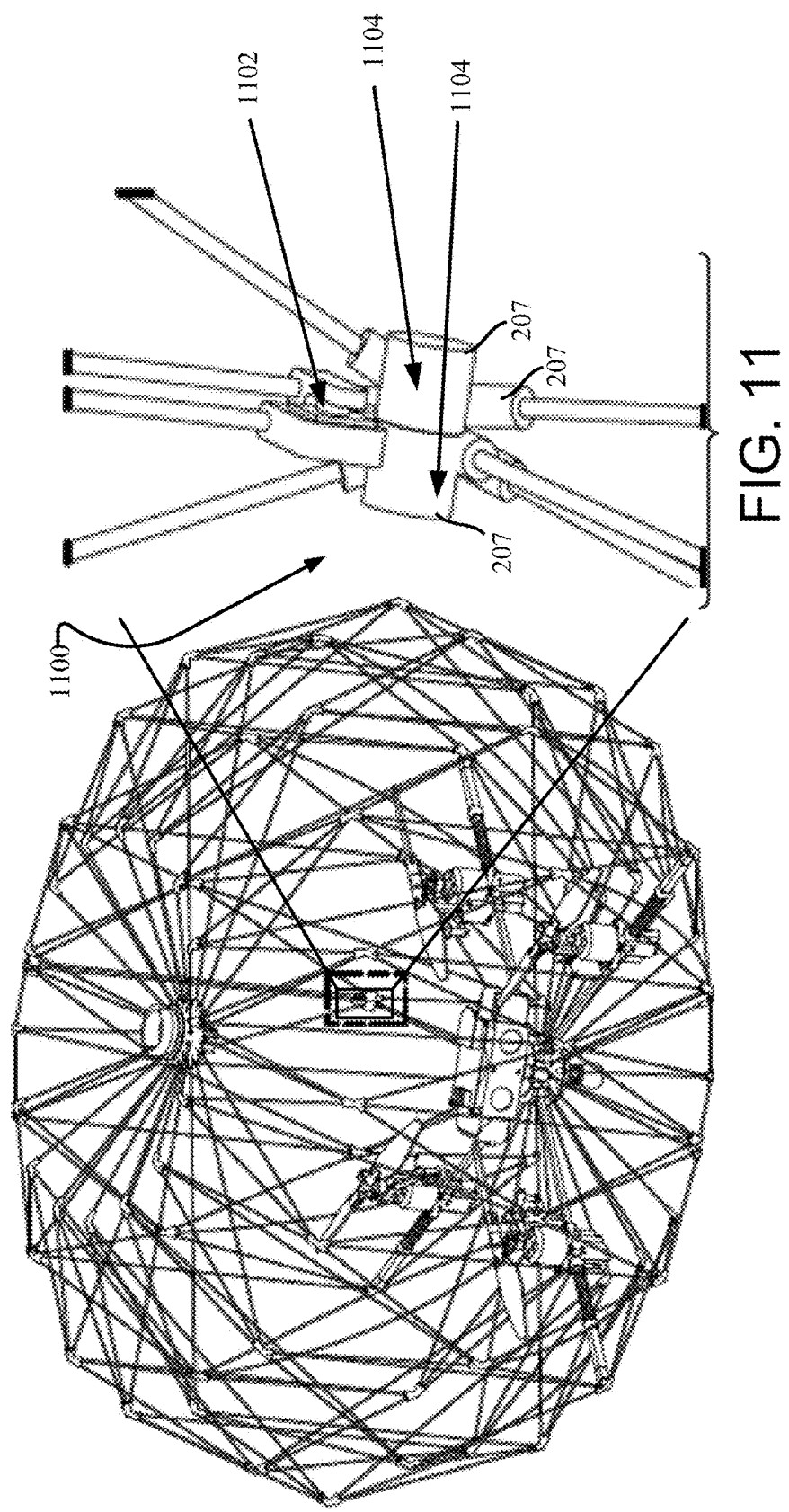

FOLDABLE AIRCRAFT WITH PROTECTIVE CAGE FOR TRANSPORTATION AND TRANSPORTABILITY

FIELD OF TECHNOLOGY

The present disclosure relates generally to aerial vehicles, and more particularly to unmanned aerial vehicles.

BACKGROUND

Drones are rapidly becoming a cost and time effective solution to traverse densely populated environments as well as to reach remote locations with limited infrastructures. Their capability to move rapidly from one point to the next and an overall cost reduction of their core technologies is capturing attention from major companies seeking affordable solutions for cargo transportation and delivery.

Drones have been developed by logistics companies with the purpose of cargo delivery. Companies mostly rely on multi-propeller drones (i.e., multicopters), leveraging their vertical take-off and landing capabilities, to deliver parcels precisely, even in cluttered environments. Drones are also very maneuverable and easy to design and manufacture. However, proposed platforms have intrinsic safety drawbacks that could prevent their deployment. Unshielded spinning propellers are a serious threat and can cause severe injuries in cases of collisions with people. Also, the drone itself and the cargo are not protected in the case of a collision, which raises questions about the possibility of transporting fragile packages. Furthermore, delivery of bigger and heavier cargos require increased drone dimensions, which makes it harder to store and to transport to the deployment point. This becomes even more problematic for the operator if there is a need to deploy several multicopters. The majority of commercially available drones provide only limited protection. The most popular approach is to add lightweight hulls or small plastic elements around the propellers, as is illustrated in FIG. 1. The effectiveness of this solution is limited to protection against side collisions and it is not suited if users want to grab the drone while it is flying.

Furthermore, even where known drones may be implemented with protective cages, it is, however, hard to place cargo inside the cage. None of these platforms are directly suited for cargo transportation due to limited space inside the cage. Attempts to carry cargo with such known drones would also negatively affect propulsion and stabilization systems. While there are several foldable drones available on the market, none of them are integrated with protective structures. There are no foldable platforms with protective structures that can transport payloads, while simultaneously providing safety for the drone, people, and cargo.

SUMMARY

The present disclosure addresses the challenge of safe drone delivery, providing an innovative design comprising a foldable protective cage integrated with a multicopter. The cage can be opened by the user and loaded with cargo. A safety mechanism ensures disengagement of the propellers while the cage is open, reducing the risk of injuries. The highly integrated designs, based on shared structural components between the cage and the multicopter, result in a drone with reduced weight and structural complexity. The foldable structure minimizes the volume added by the cage making the drone easy to store and transport when stowed. The cage protects cargo and robotics during low altitude falls while a parachute, which can be installed outside the cage, protects against high altitude falls.

Further advantages of the design approach according to the disclosure is that humans can easily and safely catch the drone while flying or let it fall from a few meters with no risk of damaging the cargo and the drone itself. During public delivery, the full cage coupled with the propeller disengagement system protects inexperienced users from injury while in close proximity to the drone or while loading it. The foldable structure allows users to easily carry the drone and use it when it is required. Reduction of volume reduces space and cost of storage.

According to an aspect of the present disclosure, an aerial vehicle may include a multicopter (including a propulsion system) and a foldable cage. The foldable cage may be substantially linear in a folded configuration and substantially circular in a deployed configuration. The foldable cage may include rods that form one or more geometric shapes. For example, the rods may form triangles when the foldable cage is in a deployed configuration. The rods may be coupled to flexible joints that direct movement of the rods during deployment or folding of the cage.

The foldable cage may additionally include a conical recess in a top portion thereof. Moreover, the aerial vehicle may include a parachute housing that couples to the foldable cage within the recess. The aerial vehicle may also include a cargo transportation mechanism that couples to the foldable cage above the propulsion system (e.g., below the parachute housing). The cargo transportation mechanism may be a net, a bag, a rigid structure, etc.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which:

FIG. 2A illustrates an aerial vehicle with a foldable cage in an unfolded configuration according to the present disclosure;

FIG. 3A illustrates an enlarged view of a flexible joint connecting rods of a foldable cage according to the present disclosure;

FIG. 3B illustrates an enlarged view of a flexible joint decoupled from rods of a foldable cage according to the present disclosure;

FIG. 5A illustrates a foldable cage in a deployed configuration according to the present disclosure;

FIG. 5B illustrates a foldable cage in a seventy-five percent (75%) deployed configuration (i.e., a twenty-five percent (25%) folded configuration) according to the present disclosure;

FIG. 5C illustrates a foldable cage in a fifty percent (50%) deployed configuration (i.e., a fifty percent (50%) folded configuration) according to the present disclosure;

FIG. 5D illustrates a foldable cage in a twenty-five percent (25%) deployed configuration (i.e., a seventy-five percent (75%) folded configuration) according to the present disclosure;

FIG. 5E illustrates a foldable cage in a folded configuration according to the present disclosure;

FIG. 6A illustrates an enlarged view of a locking mechanism of a foldable cage coupled to rods of the foldable cage according to the present disclosure;

FIG. 6B illustrates an enlarged view of a decoupled locking mechanism of a foldable cage decoupled from rods of the foldable cage according to the present disclosure;

FIG. 9C illustrates a folded configuration of a foldable cage according to the present disclosure;

FIG. 11 illustrates an enlarged view of a safety mechanism of a foldable cage according to the present disclosure;

DETAILED DESCRIPTION

The present disclosure describes an unmanned aerial vehicle (i.e., a drone) for transportation featuring foldability for enhanced transportability and simultaneous protection for cargo, people, and the drone itself. The design according to the disclosure implements subsystems and components including a foldable protective cage integrated with a multicopter and with a cargo integration mechanism, and additional safety mechanisms. The foldable protective cage may substantially or fully enclose the multicopter when the foldable cage is in either a fully deployed configuration and/or a fully folded configuration.

Designing a foldable cage for simultaneous protection of people, cargo, and the drone according to the disclosure requires addressing different challenges. The cage should be dense enough to prevent people and external objects from touching the fast rotating propellers, but, at the same time, it should minimally affect the airflow from the propellers. The cage should be able to absorb the energy of a collision, protecting the drone, and decelerating the transported cargo to avoid damage. The cage should be lightweight, and it should be able to reduce its size for easy transportation, protecting the main components of the system even when in a folded state.

These challenges, among other things, are addressed through the development of an origami-inspired, foldable protective structure integrating the drone and the cargo as described in detail herein. Origami based techniques facilitate development of a foldable structure capable of a significant reduction of volume with a simple manufacturing process. The structure is implemented with a minimal number of different pieces, can be manufactured flat, and assembled to the final shape by folding its body.

Figure 1:
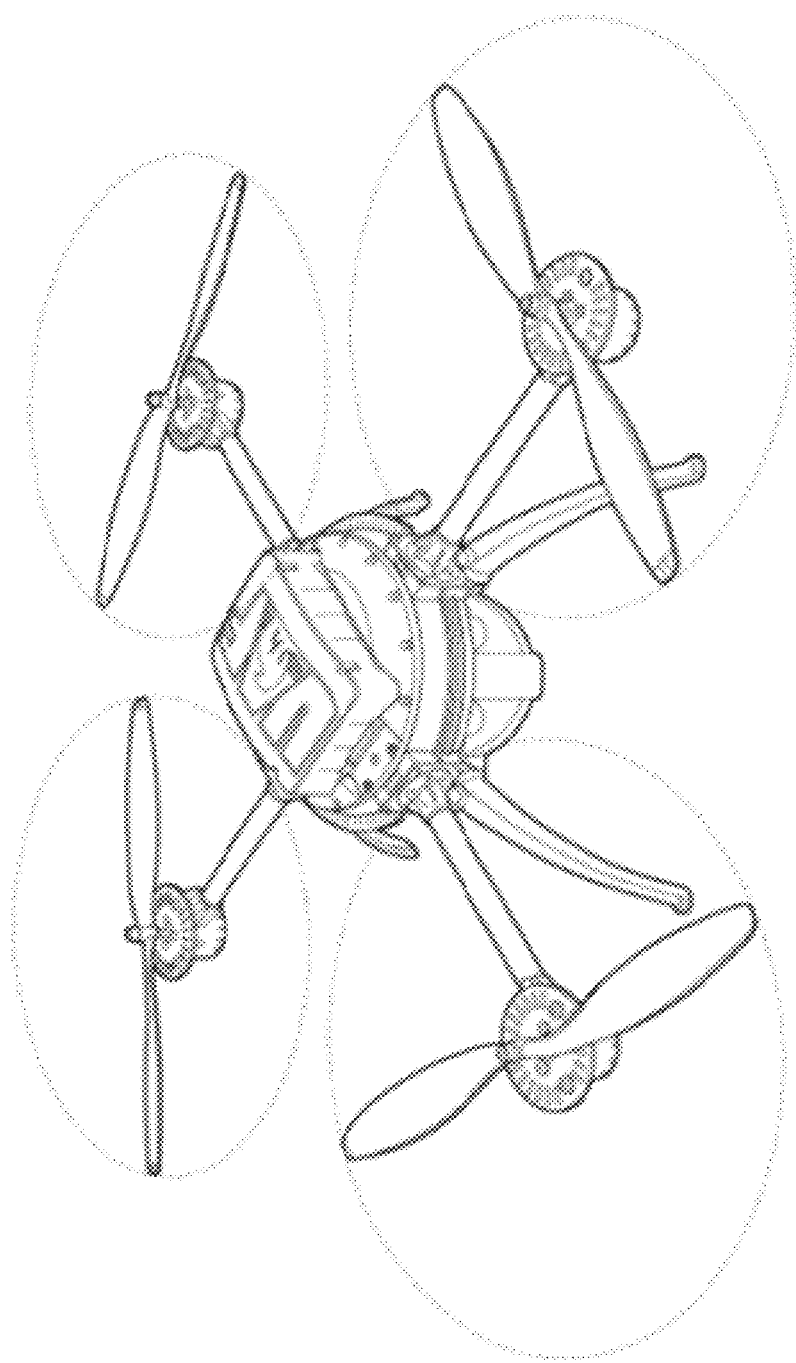
FIG. 1 illustrates an aerial vehicle with protection elements around the propellers, according to the prior art.
Figure 2B:
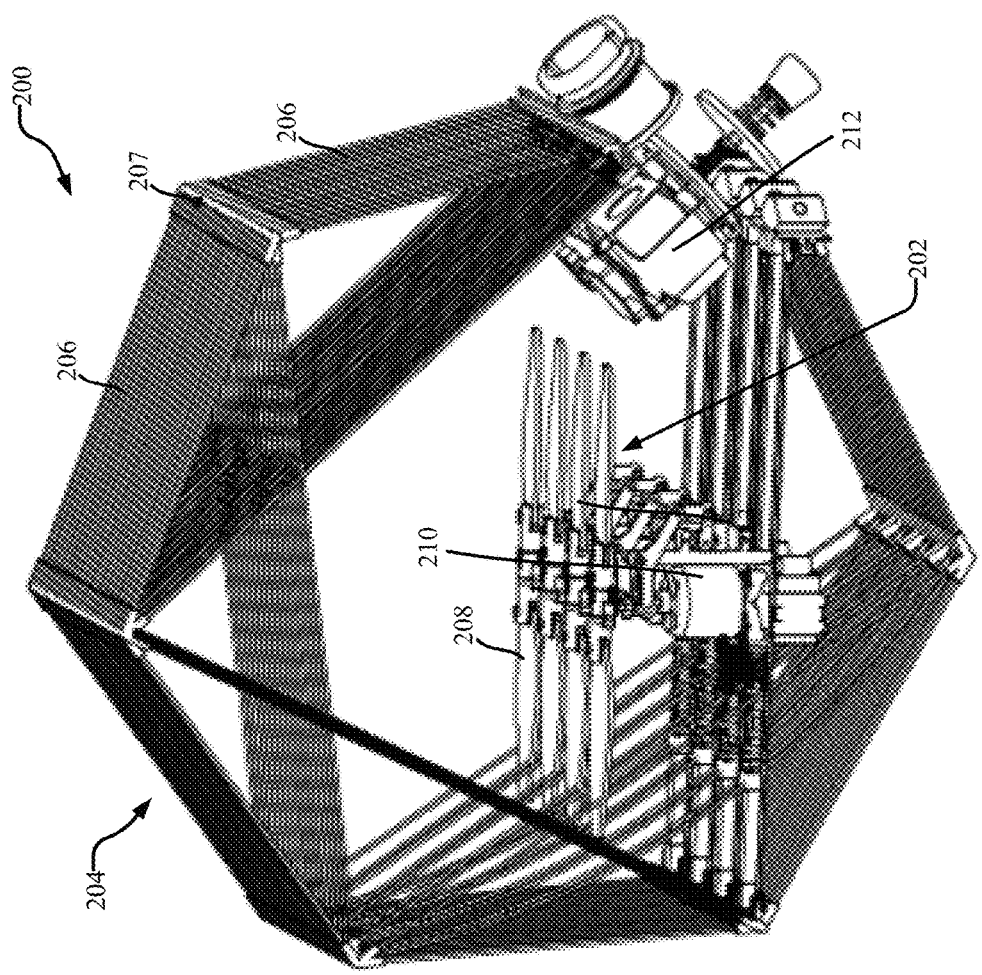
FIG. 2B illustrates an aerial vehicle with a foldable cage in a folded configuration according to the present disclosure.

FIGS. 2A and 2B collectively illustrate a drone 200 including a multicopter 202 and a foldable cage 204. The foldable cage 204 provides protection to robotics, propellers, and other components of the multicopter 202. The cage 204 is composed of rods 206 angularly connected (by flexible joints 207 as discussed in detail herein below) to provide structural integrity to the cage 204 and to allow the cage 204 to fold for easy transportation of the drone 200. The multicopter 202 includes at least two propellers 208. As illustrated, the multicopter 202 has four propellers 208. However, it should be appreciated that the multicopter 202 may include more or less than four propellers 208 without departing from the scope of the present disclosure. Each propeller 208 has at least one corresponding motor 210 that causes the propeller 208 to rotate about an axis. The motors 210 receive power from a central housing unit 212, which may include, among other things, a battery, an autopilot, and other electronics configured to operate upon the motors 210 in response to signals received from a remote control device. When the cage 204 folds or deploys, arms 213 of the multicopter 202 may fold or deploy with the cage 204.

The drone 200 may optionally include a parachute that protects the drone 200 from high altitude falls. The parachute may be stored in a parachute housing 214 located on an outside of the cage 204 (as illustrated in FIG. 2A). Alternatively, the parachute housing 214 may be located on an inside of the cage 204 at a location (e.g., near a top of the cage 202) that provides adequate deployment of the parachute and deceleration of the drone 200. The cage 204 may have a recess located centrally in the top of the cage 204. When the cage 204 is configured as such, the parachute housing 214 may be placed within the recess. Placement of the parachute housing 214 within the recess protects the parachute housing 214 from side collisions with external objects. The recess of the cage 204 may be conical. Moreover, the parachute housing 214 may also have a conical shape that allows the parachute housing 214 to be placed within the conical recess. However, one skilled in the art should appreciate that the recess of the cage 204 and the parachute housing 214 are not limited in shape, and that either or both the recess of the cage 204 and/or the parachute housing 214 may have a non-conical shape without departing from the scope of the present disclosure. By placing the parachute housing 214 at the top of the cage 204, a parachute can be easily ejected from the parachute housing 214 without the drone 200 (i.e., components thereof), interfering with deployment of the parachute. The parachute housing 214 may be made of a flexible material, which helps absorb energy of a collision (e.g., if the drone 200 falls vertically while it is upside down). The parachute housing 214 may house a canopy of the parachute, cords, and an ejecting mechanism for deploying the parachute canopy.

FIGS. 3A and 3B illustrate flexible joints 207 that may compose parts of the cage 204. Rigid rods 206 of the cage 204 connect to the flexible joint 207. The flexible joint 207 constrains movement of the rods 206 thereby allowing the cage 204 to smoothly fold and deploy. The flexible joint 207 includes holes within which rods 206 insert. Each hole may be configured to receive a single rod 206. The flexible joint 207 may be a single structure made of variable stiffness materials, such as polymers (e.g. rubber, plastic) or the like (or combinations thereof).

Figure 4C:
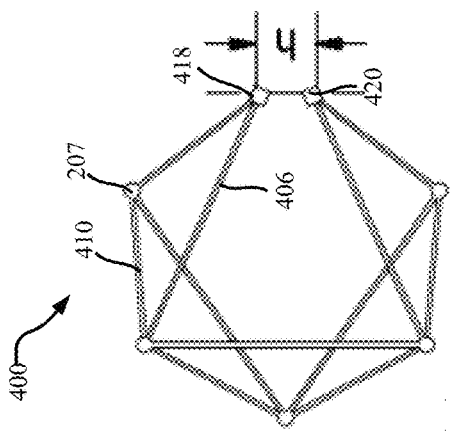
FIG. 4C illustrates a module of a foldable cage in a folded configuration according to the present disclosure.
Figure 4E:
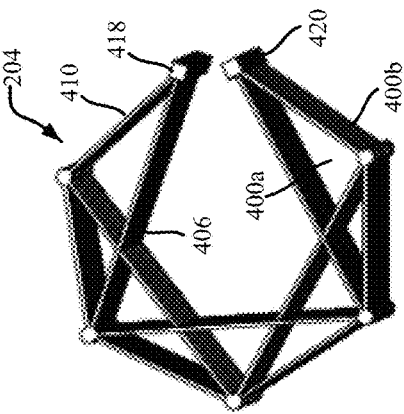
FIG. 4E illustrates a foldable cage in a folded configuration according to the present disclosure.
Figure 4B:
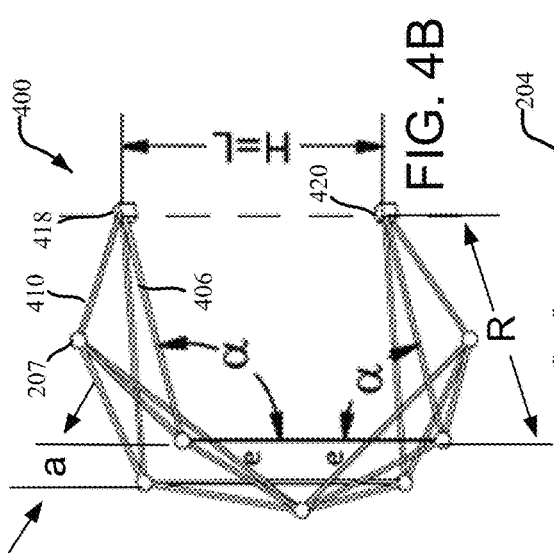
FIG. 4B illustrates a module of a foldable cage in a deployed configuration according to the present disclosure.
Figure 4D:
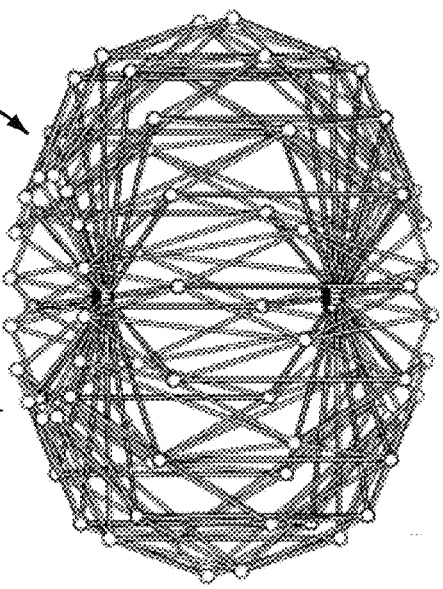
FIG. 4D illustrates a foldable cage in a deployed configuration according to the present disclosure.
Figure 4A:
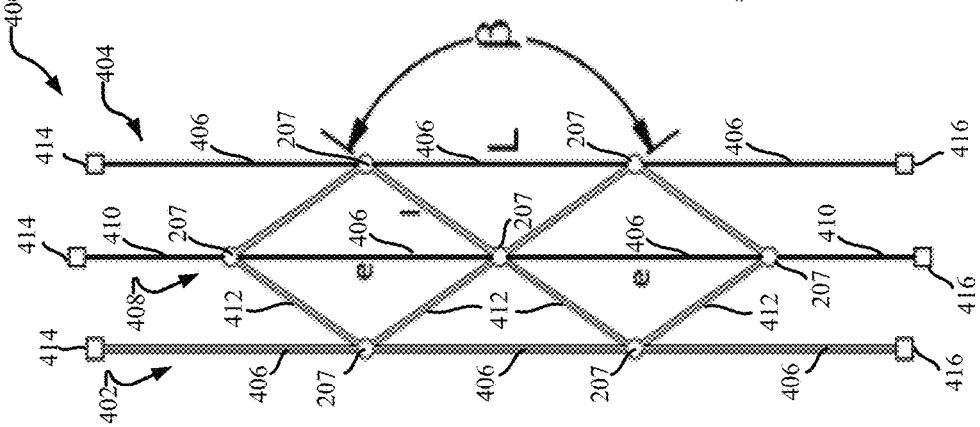
FIG. 4A illustrates a flat pattern of a module of a foldable cage according to the present disclosure.

FIGS. 4A through 4E illustrate various modules of the cage 204, and the cage 204 itself, in folded and deployed configurations. FIG. 4A illustrates a module 400 of the cage 204 assembled in a flat configuration. The module 400 includes three linear or substantially linear portions that are parallel or substantially parallel with respect to each other. Two of the portions (e.g., the two outside/exterior portions 402, 404) are made of rods 406 of selected lengths, as a function of the size or dimensions of the cage/drone, having ends that connect to flexible joints 207. A third portion of the module 400 (e.g., a middle portion 408) is composed of two interior rods 406 and two end rods 410. It should be appreciated that the rods of the three portions 402, 404, 408 of the module 400 that are identically denoted 406 may have the same length and width, and may or may not be made of the same material.

The linear or substantially linear portions 402, 404, 408 of the module 400 are interconnected by connecting rods 412. Each connecting rod 412 has two ends, with a first end connecting to a flexible joint 207 of one linear or substantially linear portion of the module 400 and a second end connecting to a flexible joint 207 of an adjacent linear or substantially linear portion of the module 400.

As further illustrated in FIG. 4A, an interior rod 406 of an outer/exterior linear or substantially linear portion 402 or 404 forms a triangle with two connecting rods 412 (i.e., two connecting rods 412 that connect to flexible joints 207 connected to ends of the interior rod 406). Each connecting rod 412 that forms a side of the triangle may have a length that is configured depending upon the length of the rod 406 and an apex angle "β" (as measured between adjacent connecting rods 412).

Each linear or substantially linear portion 402, 404, 408 includes a top end 414 and a bottom end 416. As illustrated in FIG. 4B, the top end 414 of each linear or substantially linear portion 402, 404, 408 may be connected into a single flexible joint (herein referred to as a central top joint 418), and the bottom end 416 of each portion 402, 404, 408 may be connected into a single flexible joint (herein referred to as a central bottom joint 420), thereby causing the module 400 to form an arcuate structure. When the ends 414, 416 of the portions 402, 404, 408 are connected into the central top and bottom joints 418, 420, an angle "α", as measured between two adjacent rods 406 (i.e., rods 406 of an exterior linear or substantially linear portion 402, 404 illustrated in FIG. 4A), may equal or substantially equal ninety degrees (90°). When a is configured as such, a length between the central top joint 418 and the central bottom joint 420 is equal or substantially equal to the rod 406 of the triangle (formed by the rod 406 and two connecting rods 412). That is, the length of the rod 406 corresponds to the height of the module 400 (i.e., the length between the central top and bottom joints 418, 420) and a radius "R" (i.e., the length of an end rod 406 of an exterior linear or substantially linear portion 402, 404 of the module 400).

The clearance/space of the module 400 in the folded configuration (i.e., the length between the central top and bottom joints 418, 420) is configurable to be compatible with various central housing units 212 (e.g., batteries, etc.). Alteration of the height of the module 400 is beneficial because some central housing units 212 have more and/or larger components that require a larger clearance (i.e., a larger clearance/space of the module 400 in the folded configuration), and vice versa. The height of the module 400 may be altered by altering the apex angle β. For example, a larger apex angle β (e.g., β≥120°) may produce a larger clearance/space of the module 400 (illustrated as "h" in FIG. 4C) and a smaller apex angle β may produce a smaller clearance/space of the module 400.

The module 400 of FIG. 4B is in a deployed configuration. By directly or indirectly connecting the central top joints 418 and the central bottom joints 420 of adjacent deployed modules 400, respectively, the deployed cage 204 of FIG. 4D is achieved. Conversely, the module 400 of FIG. 4C is in a folded configuration. By directly or indirectly connecting the central top joints 418 and the central bottom joints 420 of adjacent folded modules 400, respectively, the folded cage 204 of FIG. 4E is achieved. For example, a single cage 204 may include sixteen (16) module 400. However, it should be appreciated that cages 204 having more or less than sixteen (16) modules 400 are within the scope of the present disclosure.

The cage 204 has a modular design composed by the repetition of the module 400 as described herein. When the cage 204 is in a folded configuration, exterior modules 400a and 400b of the cage 204 may be distal from one another (as illustrated in FIG. 4E). When the cage 204 is in a deployed configuration (as illustrated in FIG. 4D), the exterior modules 400a and 400b of the cage 204 may be adjacent to, and optionally abut, one another.

The flat module 400 illustrated in FIG. 4A is the result of a tessellation of congruent isosceles triangles. The length L of the rods 406 correspond to longer edges of triangles formed by the rods 406 and the connecting rods 412, and corresponds to a radius R and a height H of internal empty space in the cage 204 (illustrated in FIG. 4B). The apex angle β is the apex angle of a triangle. The apex angle β influences the length h (illustrated in FIG. 4C) between the central top and the central bottom joints 418, 420 of the cage 204 in the folded configuration. The apex angle β also influences the width "a" of the module 400 when in a deployed configuration. Therefore, it may be desirable in some implementations to ensure the apex angle β is not smaller than about 120°, as configuring the apex angle β smaller than about 120° in certain implementations may cause the central top and central bottom joints 418, 420 to interfere when the module 400 is in a folded configuration (i.e., h<0). Empty space between the central top and central bottom joints 418, 420 of a folded cage 204 (marked as dimension h in FIG. 4C) facilitates a place for components of the multicopter 202 (autopilot, battery, etc.). The length "l" of a connecting rod 412 is the length of a shorter arm of a triangle and is dependent on the chosen length L and apex angle β.

Geometrical design and principles of folding influence two dimensions of the cage 204. Because of this, the height H of the internal free space of the cage 204 and the cage's radius R are equal, or substantially equal, to the length L (illustrated in FIG. 4B). Thus, the cage's diameter may not remain constant if the height of the cage 204 is reduced. One advantage of configuration the cage 204 as disclosed herein is the number of parts (i.e., rods and joints) of the cage 204 are kept to a minimum. Another advantage is the modules 400 of the cage 204 may be originally assembled in the flat configuration illustrated in FIG. 4A. This minimizes assembly duration and complexity. The configurable dimensions of the inner free space of the cage 204 as detailed herein facilitate easy adaptation to weight (e.g., the size of the multicopter's components to fit within the free space) and to size (e.g., size of packages capable of fitting within the free space) considerations that are unique to each aerial vehicle and its use.

To facilitate integration of multicopter 200 components with the cage 204, the vertical and horizontal rods 406 having lengths L (as illustrated in FIG. 4B) may be perpendicular, or substantially perpendicular, when the module 400 of the cage 204 is formed into an arcuate structure. In this illustrative example, when the cage 204 is fully deployed (i.e., when each segment 400 of the cage 204 is in a deployed configuration), each module 400 of the cage 204 is configured with a constant distance H between the module's central top and central bottom joints 418, 420 (as illustrated in FIG. 4B). This is, at least in part, possible due to the middle rods 406 (i.e., the middle rods 406 of the middle portion 408 in FIG. 4A) that hold the top and bottom part of the cage 204 in position.

FIGS. 5A through 5E illustrate the folding process of the cage 204. FIG. 5A illustrates the cage 204 in a fully deployed configuration. FIG. 5B illustrates the cage 204 in a 25% folded (or 75% deployed) configuration. FIG. 5C illustrates the cage 204 in a 50% folded (or 50% deployed) configuration. FIG. 5D illustrates the cage 204 in a 75% folded (or 25% deployed) configuration. FIG. 5E illustrates the cage 204 in a fully folded configuration.

The first and last modules 400a and 400b of the cage 204 may be connected together with a side locking mechanism 600 as illustrated and described in detail with respect to FIGS. 6A and 6B below. The side locking mechanism may lock the cage 204 in the deployed and/or folded configuration. For example, to fold the cage 204, the first and last modules 400a and 400b may need to be unlocked and then manually or electronically pushed or forced apart from each other. During this action, all the modules of the cage 204 fold and rotate around a central axis (illustrated as dashed line E-E in FIG. 5E) of the cage 204. At the same time, the top and bottom central joints 418, 420 get closer to each other, bringing the cage 204 to a final folded polygonal shape (see FIG. 4C for the polygonal shape and FIGS. 4E and 5E for the folded cage 204). To deploy the cage 204, the aforementioned procedure may merely be reversed.

The modular design of the cage 204 as detailed herein allows assembly of the cage 204 with a number of modules 400 that may be tailored to user and/or aerial vehicle preferences. In general, to facilitate integration of the cage 204 with a multicopter 202, it may be beneficial for the number of modules 400 of the cage 204 to be divisible by the number of arms 213 of the multicopter 202. For example, if the multicopter 202 has 4 arms/propellers 210, the cage 204 may be configured to have 4, 8, 12, 16, etc. modules 400. Moreover, while a dense cage 204 with a high number of modules 400 may provide better energy absorption in the case of a collision, and better safety by preventing access to spinning propellers, the dense cage 204 may result in increased drag, thereby reducing the payload capacity and autonomy and potentially maneuverability of the aerial vehicle 200.

FIGS. 6A and 6B illustrate a side locking mechanism 600 that may form part of or be connected to the cage 206. The side locking mechanism 600 includes magnets 602 encapsulated in flexible joints 207. The flexible joints 207 include holes within which rods 206 insert. Each hole may be configured to receive a single rod 206, or multiple rods 206. The side locking mechanism 600 keeps the first and last modules 400a and 400b of the cage 204 connected together while the cage 204 is deployed. The cage 204 may include one side locking mechanism 600 or more than one side locking mechanism 600. The side locking mechanism 600 may be composed of other systems that allow the first and last modules 400a and 400b of the cage 204 to be connected together while the cage 204 is deployed.

Figure 7C:
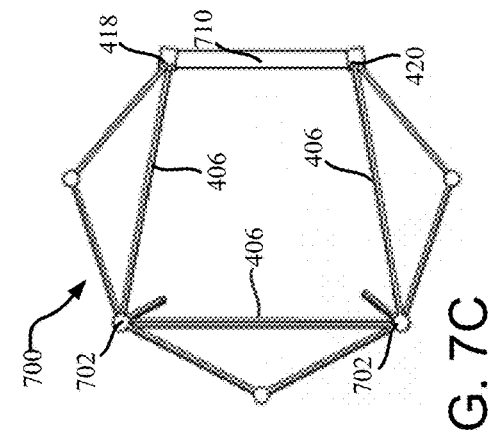
FIG. 7C illustrates a module including inextensible material of a foldable cage in a folded configuration according to the present disclosure.
Figure 7B:
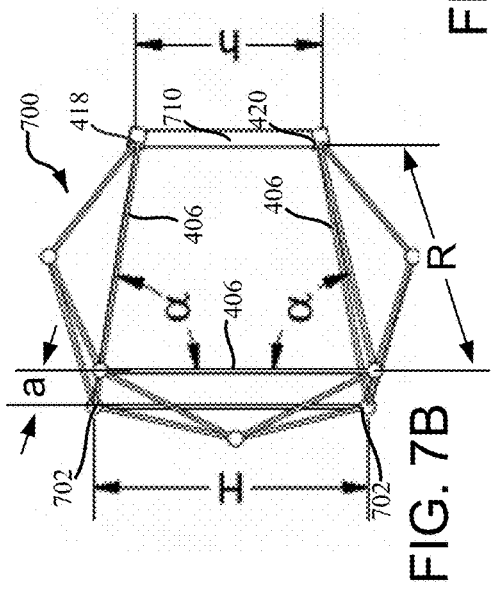
FIG. 7B illustrates a module including inextensible material of a foldable cage in a deployed configuration according to the present disclosure.
Figure 7A:
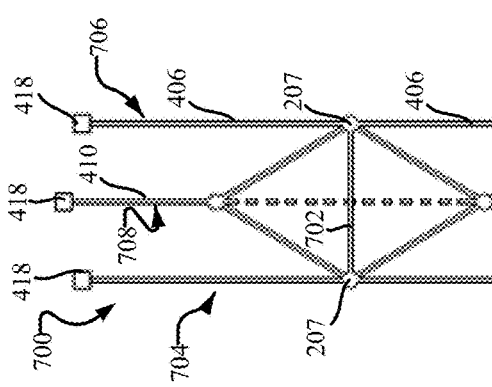
FIG. 7A illustrates a flat pattern of a module including inextensible material of a foldable cage according to the present disclosure.

It should be appreciated, however, that according to alternative embodiments illustrated in FIGS. 7A-7E, simple modifications in the structure of the cage 204 allow for decoupling of the height H and the radius R of the cage 204. With reference to FIG. 7A, in addition to the components of the module 400 described above with respect to FIG. 4A, the module 700 of FIG. 7A may additionally include an inextensible material 702, such as a flexible wire, that interconnects exterior linear or substantially linear portions 704, 706 of the module 700. Moreover, as compared to the module 400 of FIG. 4A, the middle/interior linear or substantially linear portion 708 of the module 700 includes two rods 410, instead of four. Specifically, the interior portion 708 of the module 700 does not have two interior rods 406 (represented by dashed lines).

Figure 7E:
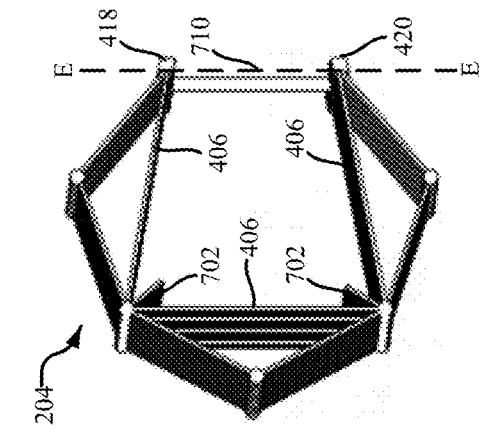
FIG. 7E illustrates a foldable cage including inextensible material in a folded configuration according to the present disclosure.
Figure 7D:
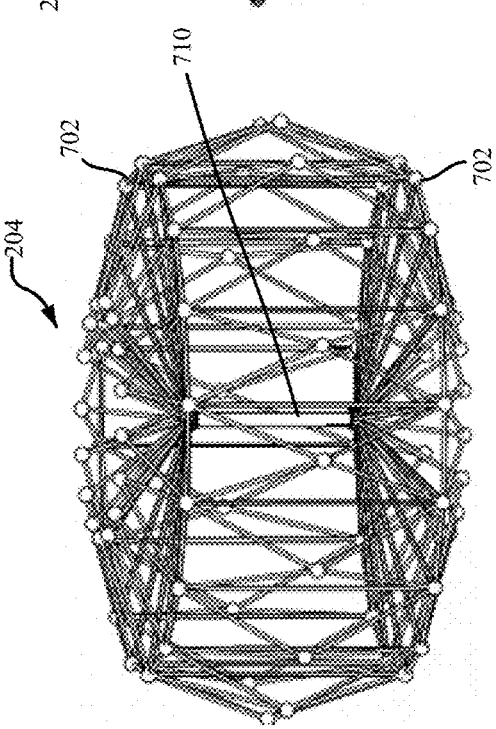
FIG. 7D illustrates a foldable cage including inextensible material in a deployed configuration according to the present disclosure.

The assembly process of the decoupled module 700 is the same as the assembly process of the module 400 but for two exceptions. Firstly, to keep a distance H (illustrated in FIG. 7B) between the central top and bottom joints 418, 420 of the module 700, a rigid cylinder 710 may be placed between the central top and bottom joints 418, 420. Secondly, the length of an inextensible wire 702 connecting exterior linear or substantially linear portions 704, 706 of the module 700 may be adapted to a width of the deployed module 700 and fixed to a flexible joint 207 of each exterior portion 704, 706 of the module 700 (illustrated in FIG. 7B). As illustrated in FIG. 7E, the inextensible wires 702 of the module 700 may be configured to fold or bend inward toward the rigid cylinder 710 (i.e., toward a center axis of the cage 204 (illustrated as dashed line E-E in FIG. 7E)) when the module 700 is in a folded configuration.

The decoupled module 700 may be configured to have a non-perpendicular angle α between rods 406 (illustrated in FIG. 7B). By having a non-perpendicular angle α, the module 700 may be able to better absorb energy during vertical collisions.

Two main advantages result from integrating the cage 204 of the present disclosure with a multicopter 202. Firstly, weight reduction is achieved because structural components can be shared between the cage 204 and other multicopter 202 components. Secondly, simplified operations are achieved because a single movement allows for the folding of both the cage 204 and multicopter 202 components (i.e., arms and propellers).

Figure 8A:
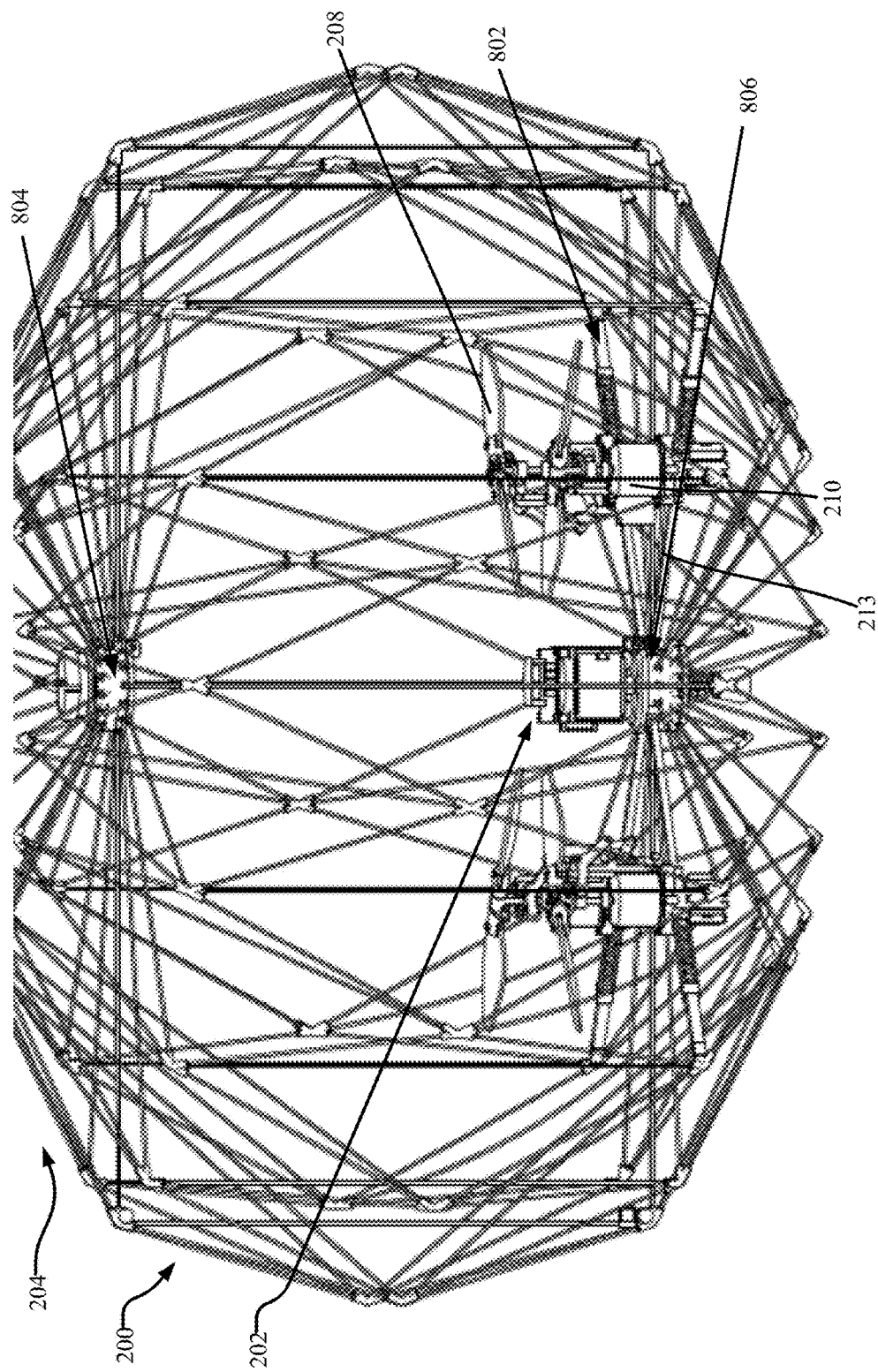
FIGS. 8A through 8C illustrate a foldable cage including various modifications to strengthen propeller arm resistance to collisions and to ensure the foldable cage does not interfere with rotating propellers according to the present disclosure.
Figure 8C:
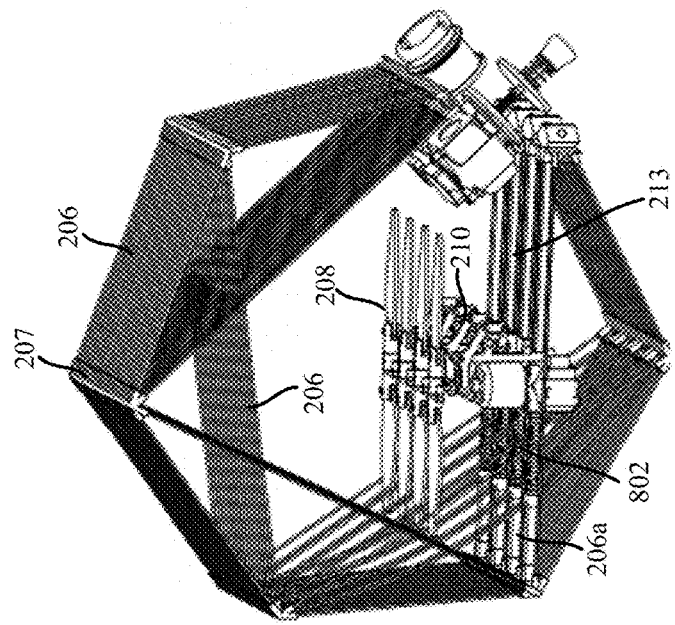
Figure 8B:
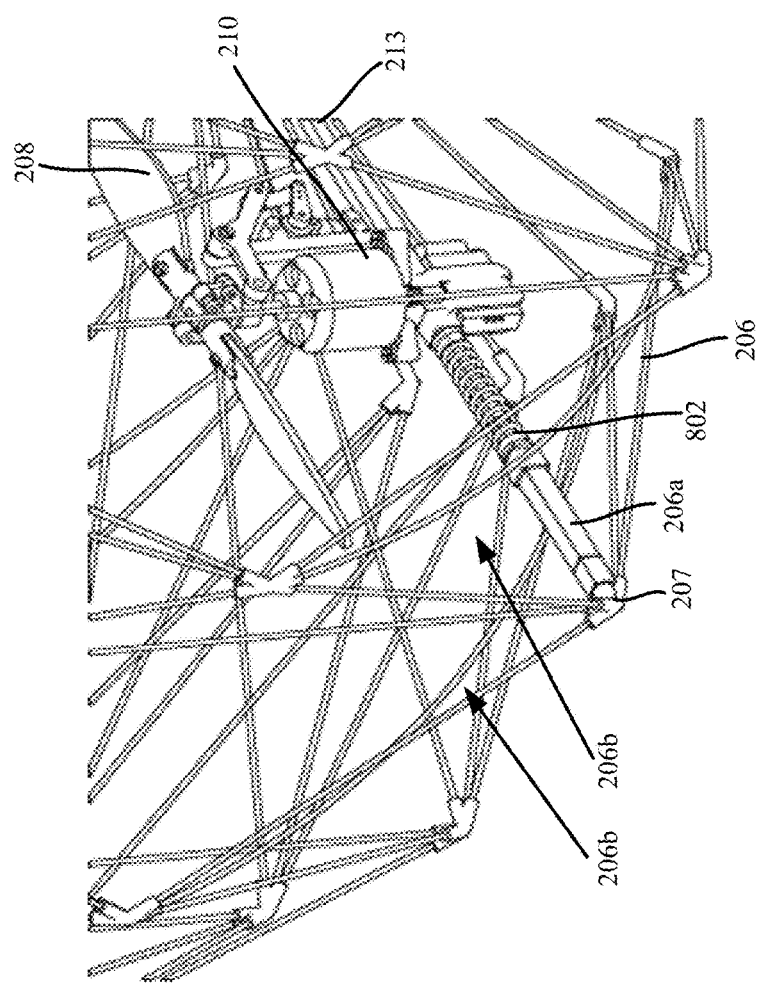

FIGS. 8A through 8C illustrate further features of the cage 204 that may be implemented regardless of whether modules 400 or decoupled modules 700 make up the cage 204. While the cage 204 has been described herein as being composed of solely modules 400 or solely decoupled modules 700, one skilled in the art should appreciate that the cage 204 may be composed of both modules 400 and decoupled modules 700.

Various modifications to the cage 204 as described herein may be implemented when the cage 204 is integrated with a multicopter 202. While the cage 204 is described as being integrated with a multicopter 202, it should be appreciated that the cage 204 may be integrated with a single-propeller system and/or other propulsion systems/components without departing from the scope of the present disclosure. For example, arms/rods 213 that hold or support motors 210 of the multicopter 202 may be strengthened to prevent undesired vibrations and oscillations that could lead to instability during flight and compromise reactivity and energetic efficiency. However, it may be desirable to not over-strengthen the arms 213 because overly stiff/rigid arms 213 may be damaged during collision.

Beneficial strengthening of the arms 213 may be achieved by increasing the size of rods 206 that couple to the arms 213. For example, thin rods 206 of the cage 204 may be replaced with thicker rods 206a, which are rigidly connected to the arms 213, which may hold the motors 210, propellers 208, and electronic speed controllers (ESC) (which are fixed to the bottom part of motors 210 to reduce drag) of the multicopter 202. According to this example, each arm 213 may couple to a single thick rod 206a. However, it should also be appreciated that more than one thick rod 206a may be coupled to a single arm 213 without over-strengthening the arm 213. In another example, external ends of the arms 213 may be equipped with a spring 802 that absorbs energy during a collision, thereby reducing the forces that act directly on the arms 213 during an axial collisions.

Still referring to FIGS. 8A-8C, the cage 204 may be equipped with a top locking mechanism 804 and a bottom locking mechanism 806. The top and bottom locking mechanisms, 804, 806 prevent the cage 204 from opening during flight or collisions.

After selecting appropriate motors 210 and propellers 208 for an expected weight and size of a payload, it may be beneficial to minimize the size of the cage 204 in both the folded and deployed configurations. This may involve two steps. First, an appropriate length L of rods 206 may be chosen. For example, an appropriate length L may be defined as being slightly bigger than a circle circumscribed around footprints of the propellers 208. It is important to leave space between the propellers' footprints and the cage 204 due to the interaction of blade vortices. Generally, a space around a propeller 208 may be around $\sqrt{2}$ times the propeller's radius. The second step may involve replacing straight rods 206 of the cage 204 with curved rods 206b (illustrated in FIG. 8B), thereby avoiding interference with rotating propellers 208.

Figure 9B:
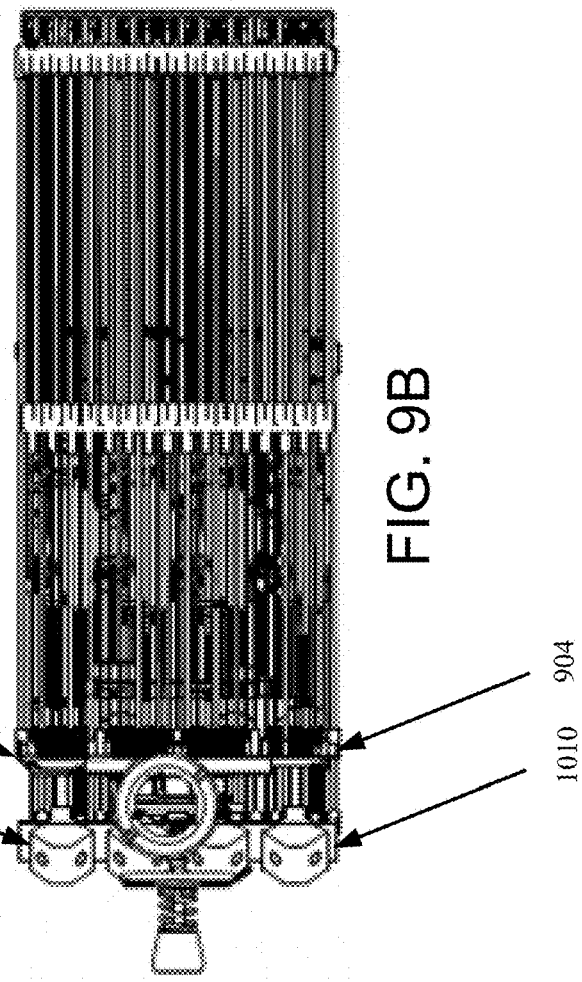
FIG. 9B illustrates a folded configuration of a foldable cage according to the present disclosure.
Figure 9A:
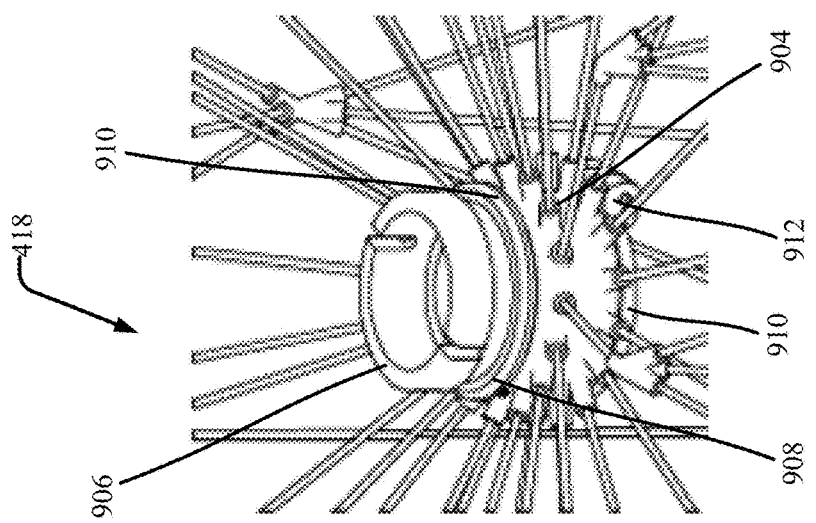
FIG. 9A illustrates a deployed configuration of a central top joint of a foldable cage according to the present disclosure.

FIG. 9A illustrates the central top joint 418 when the cage 204 is in a deployed configuration and FIG. 9B illustrates the cage 204 in a folded configuration. The diameter of the central top joint 418 may be configured to the unique properties of each aerial vehicle 200. For example, the diameter of the central top joint 418 may be configured to orient the modules of the cage 204 to be parallel or substantially parallel when the cage 204 is folded. The central top joint 418 includes a central top joint locking mechanism (described below) that keeps the cage 204 in a deployed configuration. Magnets 912 may be located at one end of the cage modules proximate to the central top joint 418. The magnets 912 may be placed to keep internal edges of the cage's modules together when the cage 204 is in a deployed configuration. Moreover, placement of the magnets 912 may result in the magnets 912 not interacting with each other when the cage 204 is in a folded configuration. According to the present disclosure, the magnets 912 may be identical or magnets 912 of a variety of shapes and sizes may be used in a single implementation. The central top joint 418 should be configured to prevent rods of the cage 204 from interfering with each other during deployment of the cage 204. The central top joint 418 may include a flexible cylinder 904 composed of a flexible stripe, to which rods 206 of modules of the cage 204 couple. The flexible stripe 904 may be equipped with a magnet 912 at each end of the stripe 904 to lock the central top joint 418 in the deployed configuration.

The central top joint 418 includes a central top joint locking mechanism that keeps the cage 204 in a deployed configuration. The central top joint locking mechanism includes a male-female mating pair of screws 906, 908. Each screw 906, 908 includes a flared portion 910 that mates with a separate edge of the flexible stripe 904. Collectively, the flared portions compress the flexible stripe 904 when the screws 906, 908 are drawn/tightened together. As the flexible stripe 904 is compressed, it is locked in a configuration that prevents the flexible stripe 904 from separating, thereby locking the flexible stripe 904 in a cylindrical configuration. It should be appreciated by those skilled in the art that alternative top joint locking mechanisms could be implemented according to the disclosure.

FIGS. 10A through 10F illustrate, among other things, bottom portions of foldable modules and a cage locking mechanism 1000 of the cage 204. The bottom portion of each foldable module includes a rigid beam 213 and a rigid segment 1004. Each rigid segment 1004 may include encapsulated pairs of magnets 1006. Each rigid segment 1004 may include one negatively charged magnet 1006 and one positively charged magnet 1006 that attracts to an oppositely charged magnet 1006 of an adjacent rigid segment 1004 during deployment of the cage 204 and while the cage 204 is deployed. Alternative magnet configurations or interconnections may be implemented in accordance with the disclosure. When the cage 204 is fully deployed, the rigid segments 1004 may form a cylinder with a hole 1008 in the center (illustrated in FIGS. 10C and 10D). For example, a locking screw 1018 or other mechanical fastener of the cage locking mechanism 1000 may be placed through the center hole.

Figure 10A:
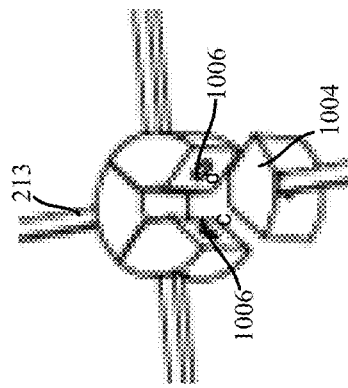
FIG. 10A illustrates a decoupled central bottom joint of a foldable cage according to the present disclosure.
Figure 10B:
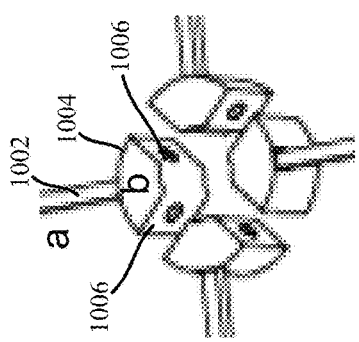
FIG. 10B illustrates a partially decoupled central bottom joint of a foldable cage according to the present disclosure.
Figure 10C:
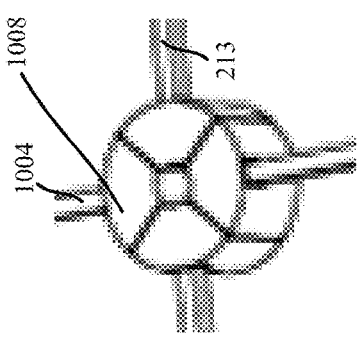
FIG. 10C illustrates a coupled central bottom joint of a foldable cage according to the present disclosure.
Figure 10D:
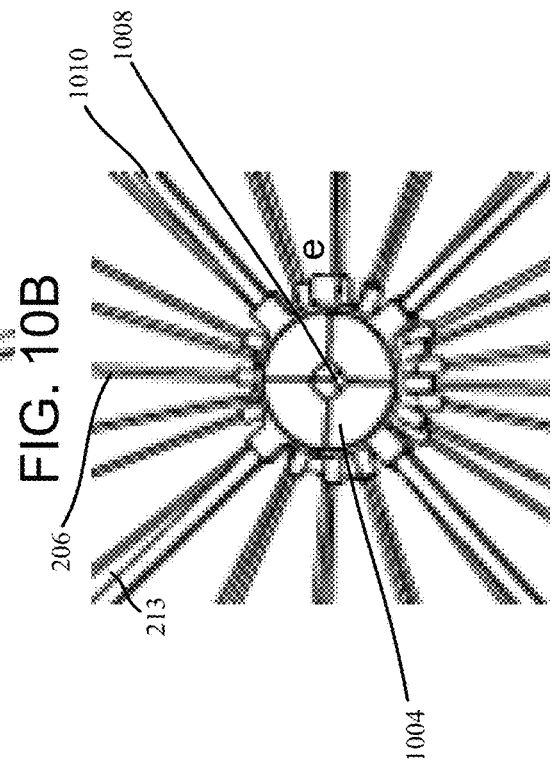
FIG. 10D illustrates a coupled central bottom joint integrated with a foldable cage according to the present disclosure.
Figure 10E:
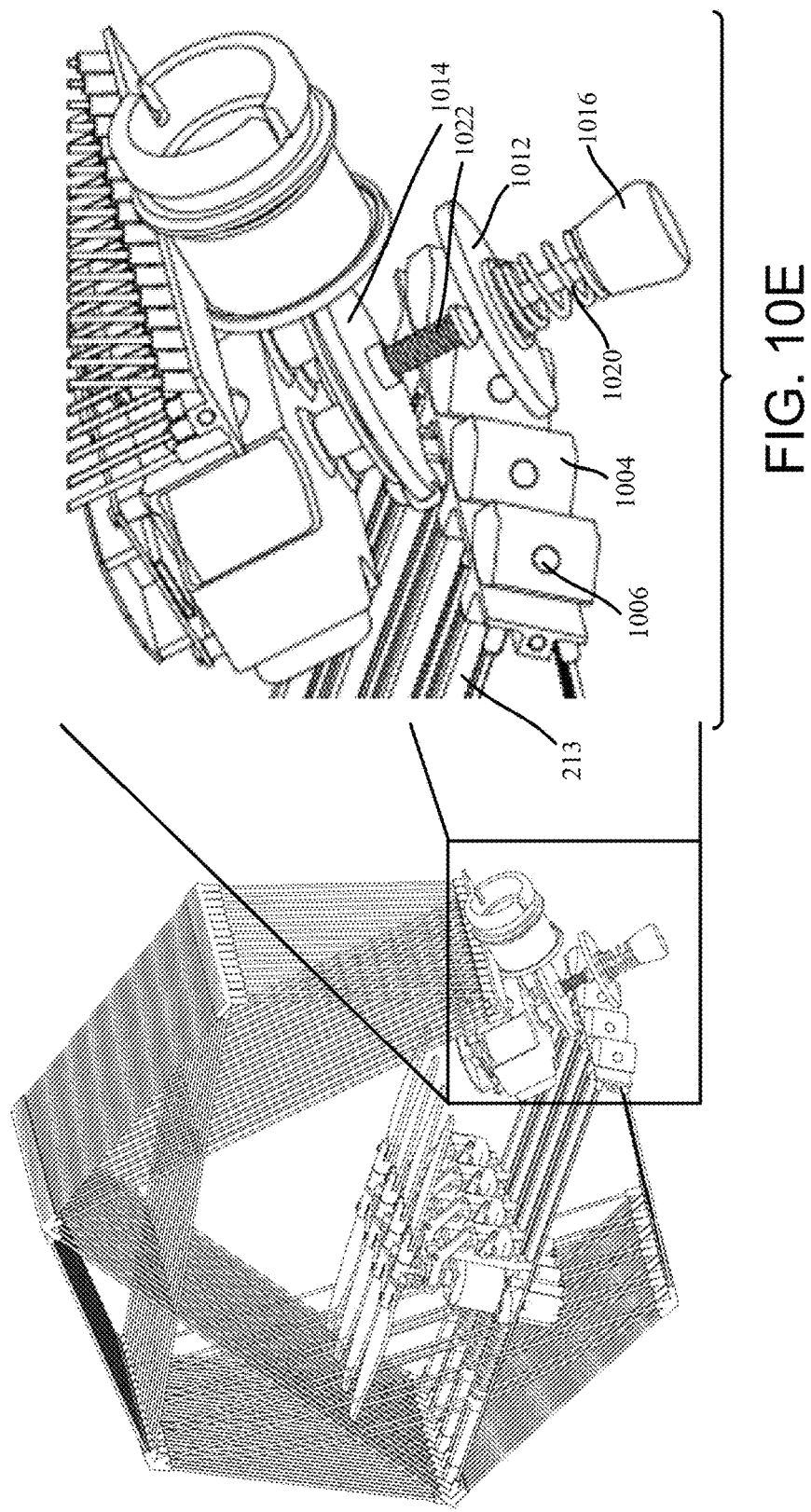
FIG. 10E illustrates an enlarged view of a central portion of an aerial vehicle including a foldable cage according to the present disclosure.
Figure 10F:
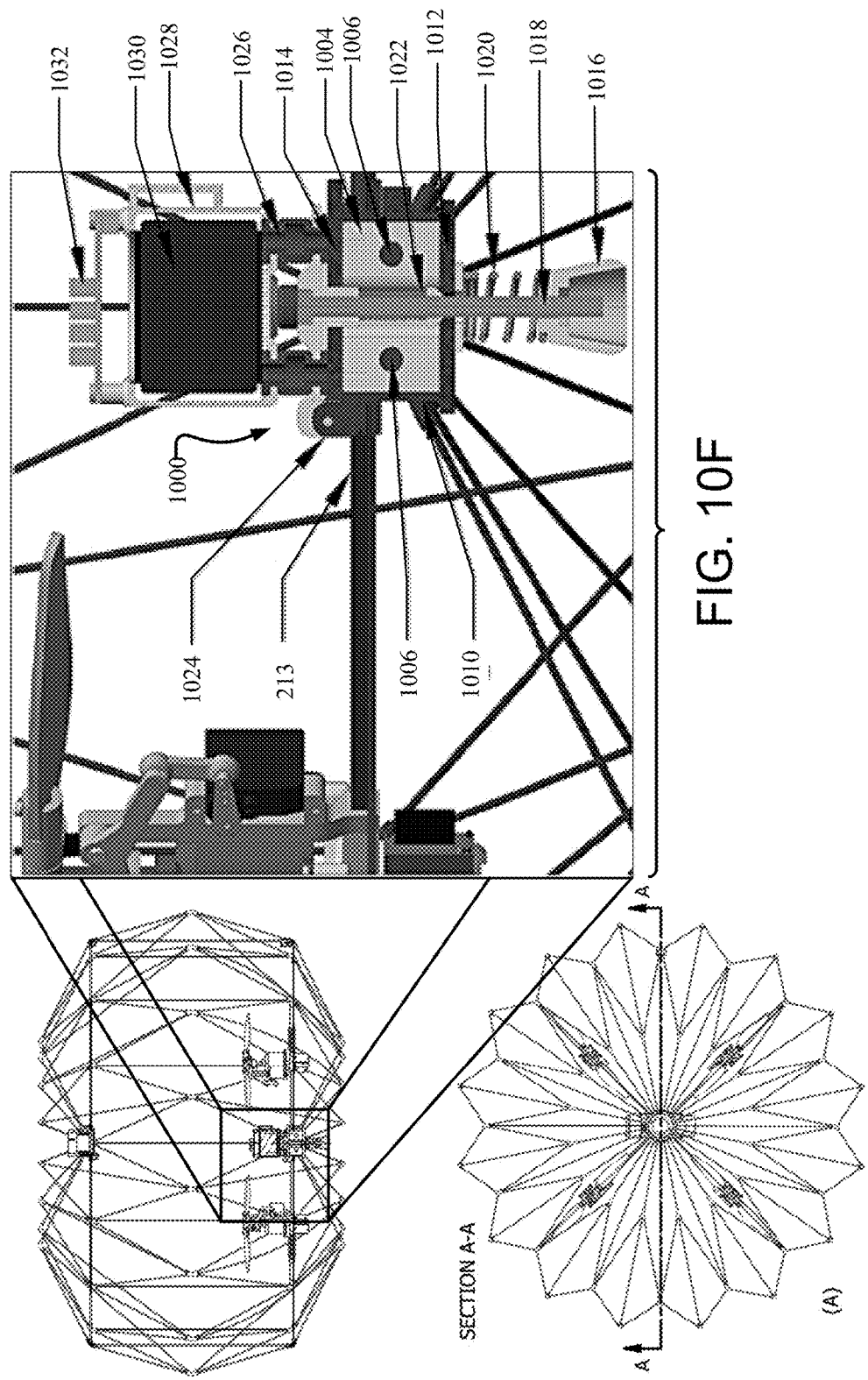
FIG. 10F illustrates an enlarged view of a cross-section of an aerial vehicle including a foldable cage taken along line A-A according to the present disclosure.

With specific reference to FIGS. 10E and 10F, the rigid segments 1004 of the modules are interconnected by a bottom flexible cylinder 1010. The cage locking mechanism 1000 may consist of two flat, rigid cylinders 1012, 1014 connected together by a nut 1016 (connected to the top cylinder) and a screw 1018. Cylinders may be placed above and below the rigid segments 1004. For example, a bottom cylinder 1012 may freely move along the screw 1018. By tightening the nut 1016, both the bottom flexible cylinder 1010 and rigid segments 1004 are compressed and may be locked into a single formation.

Additionally, two compression springs 1020, 1022 may be located in the cage locking mechanism 1000 to form a disengagement mechanism used to decrease damage to the arms 213 caused by a collision. A first compression spring 1020 may be between the nut 1016 of the screw 1018 and the bottom cylinder 1012. This allows rigid segments 1004 to disengage in case of a collision. The second spring 1022 may be placed between the flat cylinders 1012, 1014 to keep a distance between the flat cylinders 1012, 1014 while the cage 204 is in a folded configuration.

A top cylinder 1014 may be biased against the flexible bottom stripe 1010 by an additional hinged joint 1024 that keeps the top cylinder 1014 in place when the cage 204 is folded. The top cylinder 1014 may additionally be connected by damping elements 1026 with a frame 1028 encapsulating the battery 1030 and autopilot 1032 of the multicopter 202.

The cage 204 of the present disclosure may be implemented with a multicopter 202 used to deliver packages. Such delivery aerial vehicles may be operated by inexperienced users Loading and unloading packages in close proximity to fast rotating propellers is very dangerous. To limit the risk of injuries, the cage 204 may be equipped with one or more safety mechanisms 1100 (illustrated in FIG. 11). A pair of switches 1102 may be installed next to the locking mechanism 1100 between modules of the cage 204. Moreover, the switches 1102 may be located proximate to pairs of magnets 1104 encapsulated within flexible joints 207 of the cage 204. While the cage 204 is open (i.e., partially or wholly folded), the switches 1102 may automatically disengage the propulsion system of the aerial vehicle 200.

Proper cargo integration is important in ensuring a stable behavior of the multicopter 202 during flight. Accordingly, proper positioning and an appropriate holding device should be used. Unsecured, freely moving transported objects can change the position/location of the center of mass of the aerial vehicle 200, thereby causing instability during flight.

Figure 12:
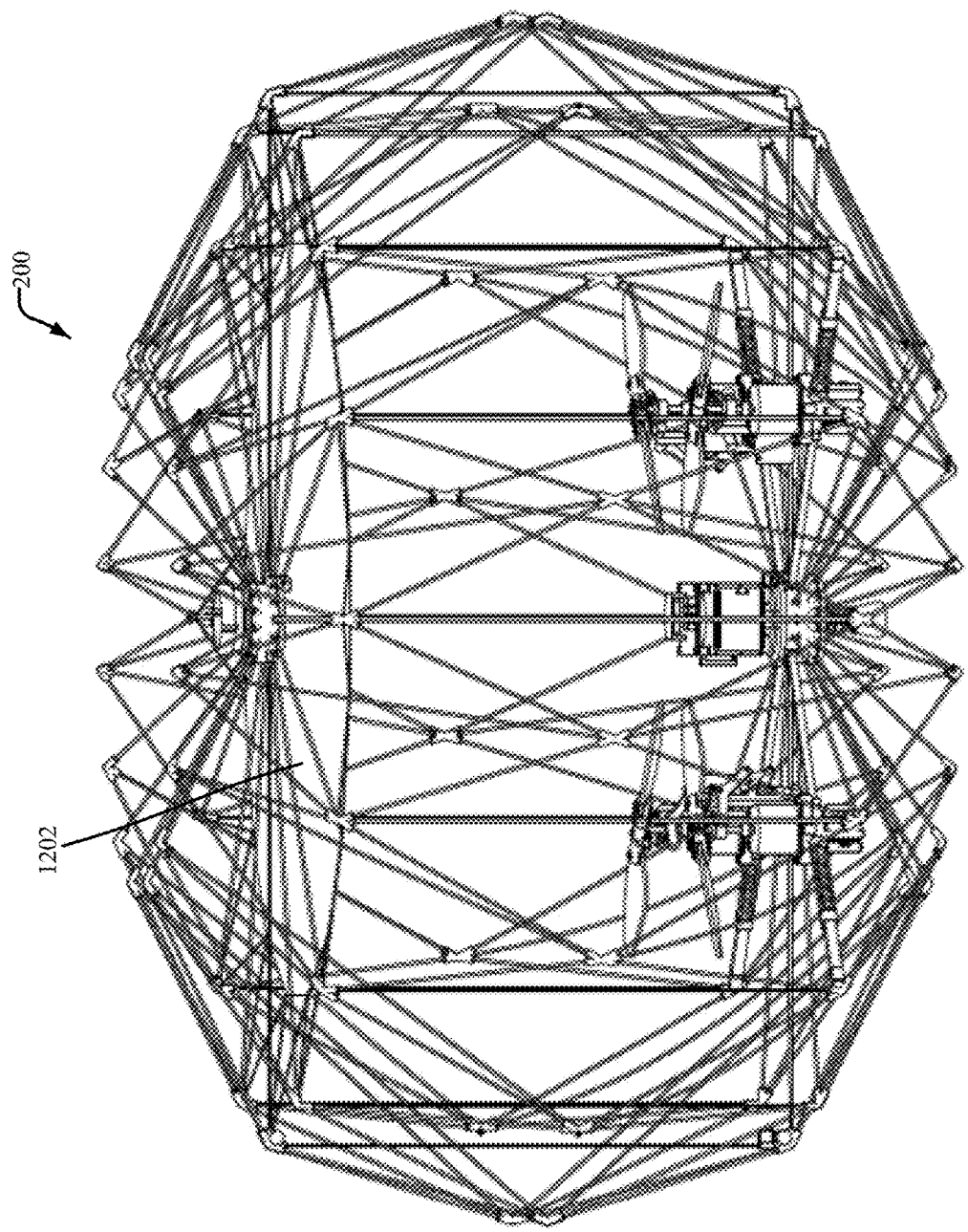
FIG. 12 illustrates an aerial vehicle including a foldable cage having a cargo attachment mechanism according to the present disclosure.
Figure 13:
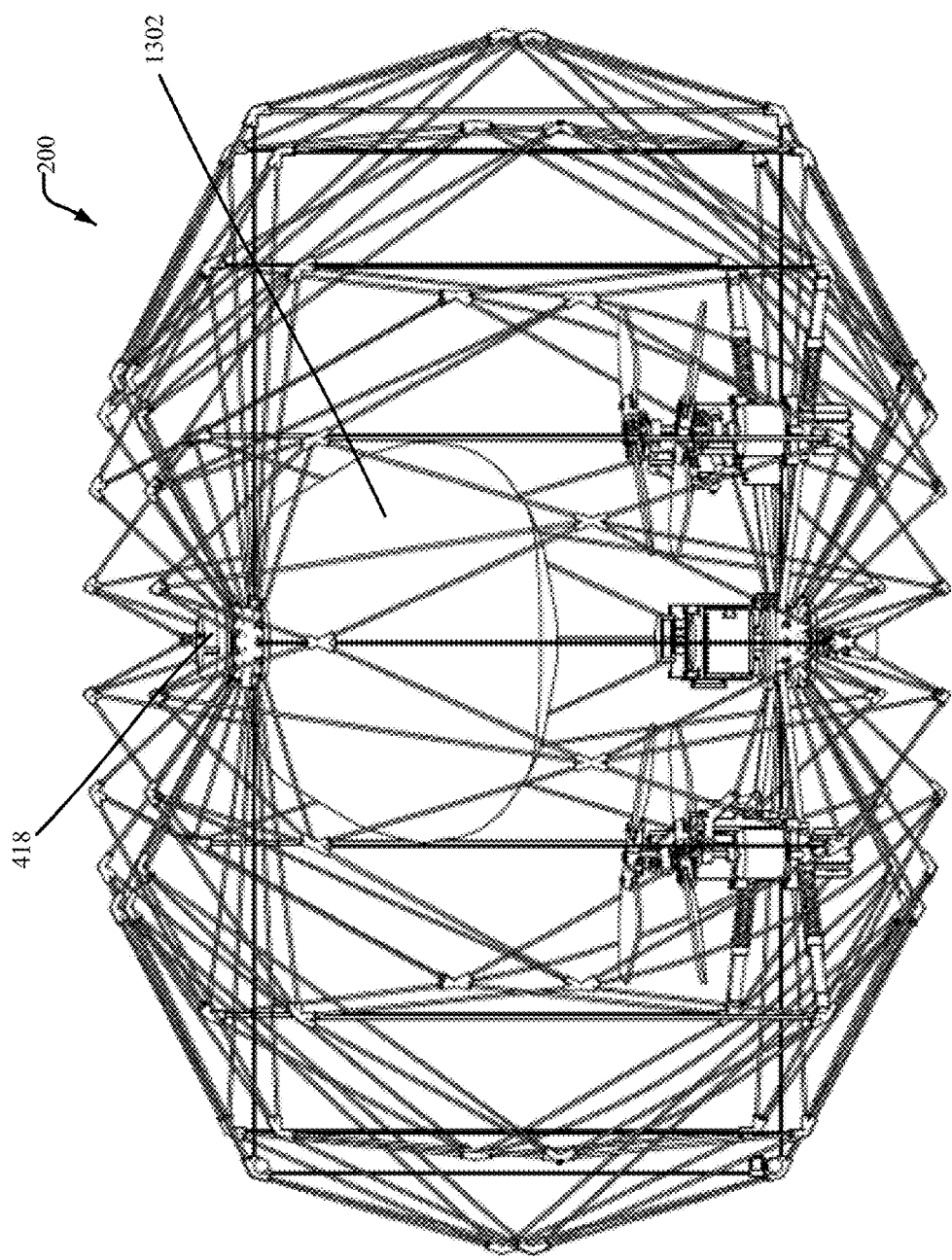
FIG. 13 illustrates an aerial vehicle including a foldable cage having a cargo attachment mechanism according to the present disclosure.
Figure 14:
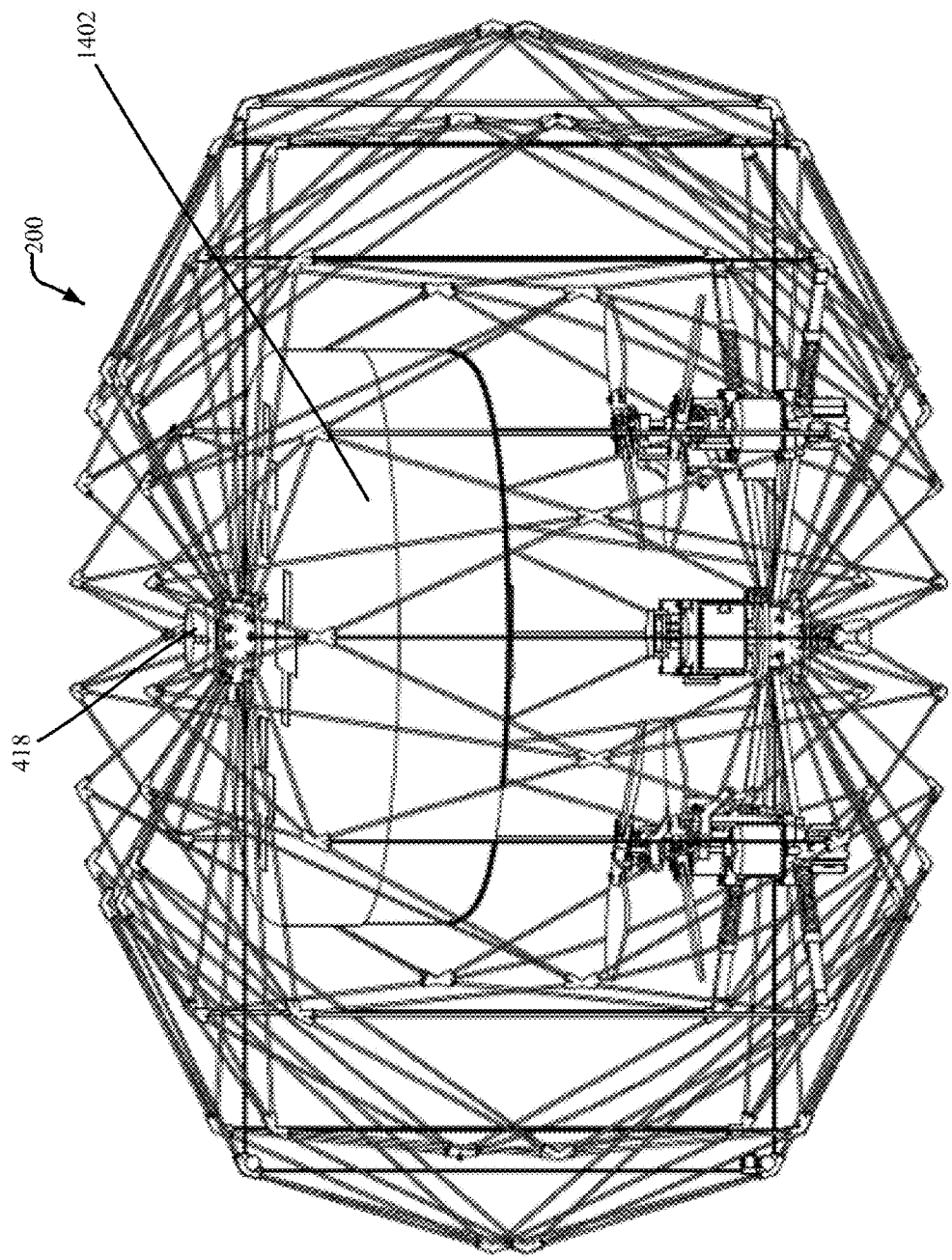
FIG. 14 illustrates an aerial vehicle including a foldable cage having a cargo attachment mechanism according to the present disclosure.

Placing cargo below the propulsion system of the aerial vehicle 200 can obstruct airflow, which can reduce flight efficiency. Moreover, allocating space in the center of the airframe between propellers 208 of the multicopter 202 results in a significant increase in the multicopter's diameter. As such, as illustrated in FIGS. 12 through 14, cargo may be beneficially placed above the multicopter's propulsion system within the cage 204. By placing cargo in this position, the aerial vehicle 200 may isolate the payload/cargo from direct contact with the external environment, thereby increasing the cargo's safety during transport.

Cargo positioned above the mainframe of the multicopter 202 and attached to the top central joint 418 of the cage 204 provides safety to the cargo. During collision the whole structure of the cage 204 acts as a system of connected Euler springs that absorb energy.

For example, FIG. 12 illustrates a mechanism for housing cargo of an aerial vehicle 200 including the cage 204. The aerial vehicle 200 includes a net 1202. Flexible ropes or wires connect edges of the net 1202 with top side joints 207 of the cage 204. The flexible ropes, while coupling the net 1202 to the cage 204, also keep cargo in the net 1202 safe because the ropes absorb energy of impact from a collision and decelerate the cargo. The net 1202 may be composed of two layers of non-extensible materials coupled by extensible material. For example, the extensible material may be sewn between the two layers of non-extensible material. In this example, the cargo may be transported between the two layers of non-extensible material. The extensible material that connects the two layers of non-extensible material may also be configured to prevent sudden movement of the cargo.

FIG. 13 illustrates an example of another mechanism for housing cargo of an aerial vehicle 200 including the cage 204. The aerial vehicle 200 includes a bag 1302. The bag 1302 may be made of fabric, for example. The bag 1302 is coupled to the cage 204. For example, inextensible ropes may couple corners of the bag 1302 to the central upper joint 418 of the cage 204. The inextensible ropes may go through a hole in the central upper joint 418, and wrap around the central upper joint 418 so both ends of the ropes connect to the bag 1302.

Cargo may be loaded into the bag 1302 a variety of ways. For example, the cargo may be placed in fabric of the bag 1302. Then, by pulling free ends of ropes attached to the fabric, the bag 1302 is drawn closer to the central top joint 418 of the cage 204. By loading cargo into the bag 1302 as such, the bag 1302 tightly fits around the cargo and allows the cargo to self-align in the center of the bag 1302 and the aerial vehicle 200. After the free ends of the ropes are pulled, the ropes are fixed by wrapping them around and attaching them to a pulley (not illustrated) located in the top of the central top joint 418. Use of the bag 1302 of the present disclosure allows the aerial vehicle 200 to expeditiously self-center the cargo.

FIG. 14 illustrates an example of yet another mechanism for housing cargo of an aerial vehicle 200 including the cage 204. The aerial vehicle 200 includes a rigid container 1402. The container 1402 may be connected to the central top joint 418 of the cage 204. More than one rigid container 1402 may be transported by the aerial vehicle 200 at once. For example, rigid containers 1402 may be vertically attached to one another within the aerial vehicle 200. The container 1402 may have flat surfaces. However, flat surfaced containers 1402 may cause drag. As such, the container 1402 may also or alternatively include rounded edges to reduce drag.

The different cargo transportation mechanisms described herein may be beneficial with respect to particularly sized and/or shaped cargo. As such, implementation of a cargo transportation mechanism may be selected according to various parameters of the aerial vehicle 200 transporting the cargo.

While the cargo transportation mechanisms described herein are implemented in the interior of the cage 204, it should appreciate that cargo may be transported on an exterior of the cage 204 using the cargo transportation mechanisms described herein, or other transportation mechanisms. For example, if the cargo to be transported is big and/or lightweight (e.g., a life vest that will not fit inside the cage 204) and there is little risk of damage to the cargo during transportation and/or collision, the cargo may be placed on the top of the cage 204.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. An aerial vehicle, comprising:
   a multicopter having propellers on foldable arms; and
   a foldable cage coupled to the multicopter, the foldable cage being substantially flat in a folded configuration and substantially circular in a deployed configuration, the foldable arms folding and deploying with the foldable cage, the foldable cage substantially fully enclosing the multicopter when the foldable cage is in at least one of the deployed configuration and the folded configuration, the foldable cage including a plurality of modules, each of the modules including flexible joints that couple a plurality of rods to form geometric elements.

2. The aerial vehicle of claim 1, wherein:
the foldable cage includes a central top joint and a central bottom joint; and
the plurality of rods of each module form triangles, the plurality of rods of each module are interconnected by the flexible joints that orient the plurality of rods of each module to form a substantially arcuate structure.

3. The aerial vehicle of claim 2, wherein each triangle has a corresponding apex angle that forms a length between the central top joint and the central bottom joint in the folded configuration.

4. The aerial vehicle of claim 1, wherein a length of the plurality of rods corresponds to a radius and a height of empty space within the foldable cage.

5. The aerial vehicle of claim 1, wherein:
the foldable cage includes a first module and a last module; and
the first module is adjacent to and attached to the last module when the foldable cage is in the deployed configuration.

6. The aerial vehicle of claim 1, wherein each triangle has a corresponding apex angle that forms a width of a module when the module is in the deployed configuration.

7. The aerial vehicle of claim 1, wherein each triangle has a corresponding apex angle less than about 120°.

8. An aerial vehicle, comprising:
a propulsion system comprising a multicopter having propellers on foldable arms; and
a foldable cage coupled to the propulsion system, the foldable arms folding and deploying with the foldable cage, the foldable cage including a central top joint and a central bottom joint, the foldable cage including modules, each module including:
rods connecting the central top joint to the central bottom joint, the rods forming a substantially arcuate structure, and
flexible joints interconnecting the rods, the flexible joints orienting the rods to form geometric shapes when the module is in a deployed configuration.

9. The aerial vehicle of claim 8, wherein the rods include curved rods, the curved rods being proximate the propulsion system.

10. The aerial vehicle of claim 8, wherein the propulsion system includes rigid beams that connect the propulsion system to the flexible joints.

11. The aerial vehicle of claim 10, wherein the propulsion system includes springs and motors, the springs interfacing with the rigid beams to absorb energy during a collision.

12. The aerial vehicle of claim 8, wherein:
the propulsion system includes rigid beams that connect the propulsion system to the central bottom joint; and
the central bottom joint includes mating members, each mating member including a pair of magnets, the magnets interconnecting the mating members when the foldable cage is in the deployed configuration.

13. The aerial vehicle of claim 8, wherein:
the foldable cage is substantially flat when in a folded configuration; and
the foldable cage is substantially circular when in the deployed configuration.

14. The aerial vehicle of claim 8, wherein the foldable cage includes a recess in a top portion thereof, and the aerial vehicle further comprising:
a parachute housing coupled to the foldable cage within the recess.

15. The aerial vehicle of claim 8, further comprising:
a cargo transportation mechanism coupled to the foldable cage.

16. The aerial vehicle of claim 15, wherein the cargo transportation mechanism is one of a net, a bag, or a rigid structure.

17. An aerial vehicle, comprising:
a propulsion system comprising a multicopter having propellers on foldable arms; and
a foldable cage coupled to the propulsion system, the foldable arms folding and deploying with the foldable cage, the foldable cage including modules, each module including:
flexible joints, and
rods interconnected by the flexible joints, the flexible joints orienting the rods to form a substantially arcuate structure.

18. The aerial vehicle of claim 17, further comprising a side locking mechanism that interconnects a first module to a last module of the foldable cage when the foldable cage is in a fully deployed configuration, the side locking mechanism being partially comprised of the flexible joints, and the aerial vehicle further comprising at least one switch configured to disengage the propulsion system when the foldable cage is in a folded configuration.

19. The aerial vehicle of claim 17, further comprising a cage locking mechanism comprising:
a top cylinder;
a bottom cylinder;
a nut in communication with the top cylinder; and
a screw in communication with the bottom cylinder, the screw acting in conjunction with the nut to cause the top and bottom cylinders to lock the foldable cage in a deployed configuration.

* * * * *